United States Patent
Keski-Luopa et al.

(10) Patent No.: US 9,848,532 B2
(45) Date of Patent: Dec. 26, 2017

(54) MODULAR LAWN MAINTENANCE MACHINE AND METHOD

(71) Applicants: Mauno Keski-Luopa, Lahti (FI); Mika Keski-Luopa, Orimattila (FI); Jukka Keski-Luopa, Espoo (FI)

(72) Inventors: Mauno Keski-Luopa, Lahti (FI); Mika Keski-Luopa, Orimattila (FI); Jukka Keski-Luopa, Espoo (FI)

(*) Notice: Subject to any disclaimer, the term of this patent is extended or adjusted under 35 U.S.C. 154(b) by 421 days.

(21) Appl. No.: 13/834,390

(22) Filed: Mar. 15, 2013

(65) Prior Publication Data

US 2013/0333342 A1   Dec. 19, 2013

Related U.S. Application Data

(60) Provisional application No. 61/660,054, filed on Jun. 15, 2012.

(51) Int. Cl.
| | |
|---|---|
| A01D 69/02 | (2006.01) |
| A01D 34/00 | (2006.01) |
| A01D 42/00 | (2006.01) |
| A01D 43/14 | (2006.01) |
| A01D 34/44 | (2006.01) |
| A01D 34/64 | (2006.01) |

(52) U.S. Cl.
CPC ........... *A01D 43/14* (2013.01); *A01D 34/006* (2013.01); *A01D 34/008* (2013.01); *A01D 34/44* (2013.01); *A01D 42/00* (2013.01); *A01D 69/02* (2013.01); *A01D 2034/645* (2013.01)

(58) Field of Classification Search
USPC .......................................... 180/20, 22, 65.6
See application file for complete search history.

(56) References Cited

U.S. PATENT DOCUMENTS

| | | | | |
|---|---|---|---|---|
| 2,295,645 A | * | 9/1942 | Flynn ...................... | E01C 19/27 180/20 |
| 3,566,761 A | * | 3/1971 | Domenighetti ......... | E01C 19/27 280/444 |
| 4,754,815 A | * | 7/1988 | Brouwer ................. | A01B 45/04 111/100 |
| 4,791,996 A | * | 12/1988 | van der Lely ....... | A01B 51/026 172/116 |
| 5,494,375 A | * | 2/1996 | Yates ...................... | E01C 19/27 172/518 |

(Continued)

FOREIGN PATENT DOCUMENTS

| | | |
|---|---|---|
| WO | 2007118924 A1 | 10/2007 |
| WO | 2007118925 A1 | 10/2007 |

(Continued)

OTHER PUBLICATIONS

Google Inventor Name (Keski-Luopa) Search Aug. 22, 2017.
WIPO Inventor Name (Keski-Luopa) Search Aug. 22, 2017.

*Primary Examiner* — Alicia Torres
(74) *Attorney, Agent, or Firm* — Carlos R. Villamar; The Villamar Firm PLLC

(57) ABSTRACT

A method, system and apparatus for a lawn or turf care maintenance machine, including at least one of fully electric operation; multi-purpose operation; and overnight, silent operation. The machine can be configured for at least one of golf course maintenance, turf care, landscaping, outdoor work, and transportation.

15 Claims, 25 Drawing Sheets

(56) References Cited

U.S. PATENT DOCUMENTS

| | | | | |
|---|---|---|---|---|
| 6,328,123 | B1 * | 12/2001 | Niemann | B60K 7/0007 180/65.51 |
| 6,611,738 | B2 * | 8/2003 | Ruffner | 701/23 |
| 8,029,399 | B2 * | 10/2011 | Thompson | B62D 11/14 180/6.44 |
| 8,322,729 | B2 * | 12/2012 | Michel | B60G 7/006 280/5.52 |
| 2005/0091953 | A1 * | 5/2005 | Turner et al. | 56/10.2 R |
| 2007/0198159 | A1 * | 8/2007 | Durkos et al. | 701/50 |
| 2007/0294991 | A1 * | 12/2007 | Medina et al. | 56/11.9 |
| 2009/0211216 | A1 | 8/2009 | Keski-Luopa | |
| 2009/0228166 | A1 * | 9/2009 | Durkos et al. | 701/26 |
| 2010/0175357 | A1 | 7/2010 | Keski-Luopa | |
| 2010/0186360 | A1 | 7/2010 | Keski-Luopa | |
| 2011/0017530 | A1 | 7/2011 | Keski-Luopa | |
| 2011/0166705 | A1 * | 7/2011 | Anderson et al. | 700/253 |

FOREIGN PATENT DOCUMENTS

| | | |
|---|---|---|
| WO | 2007118926 A1 | 10/2007 |
| WO | 2007118927 A1 | 10/2007 |
| WO | 2009007505 A1 | 1/2009 |
| WO | 2009007506 A1 | 1/2009 |
| WO | 2009007509 A1 | 1/2009 |
| WO | 2009068752 A1 | 6/2009 |

* cited by examiner

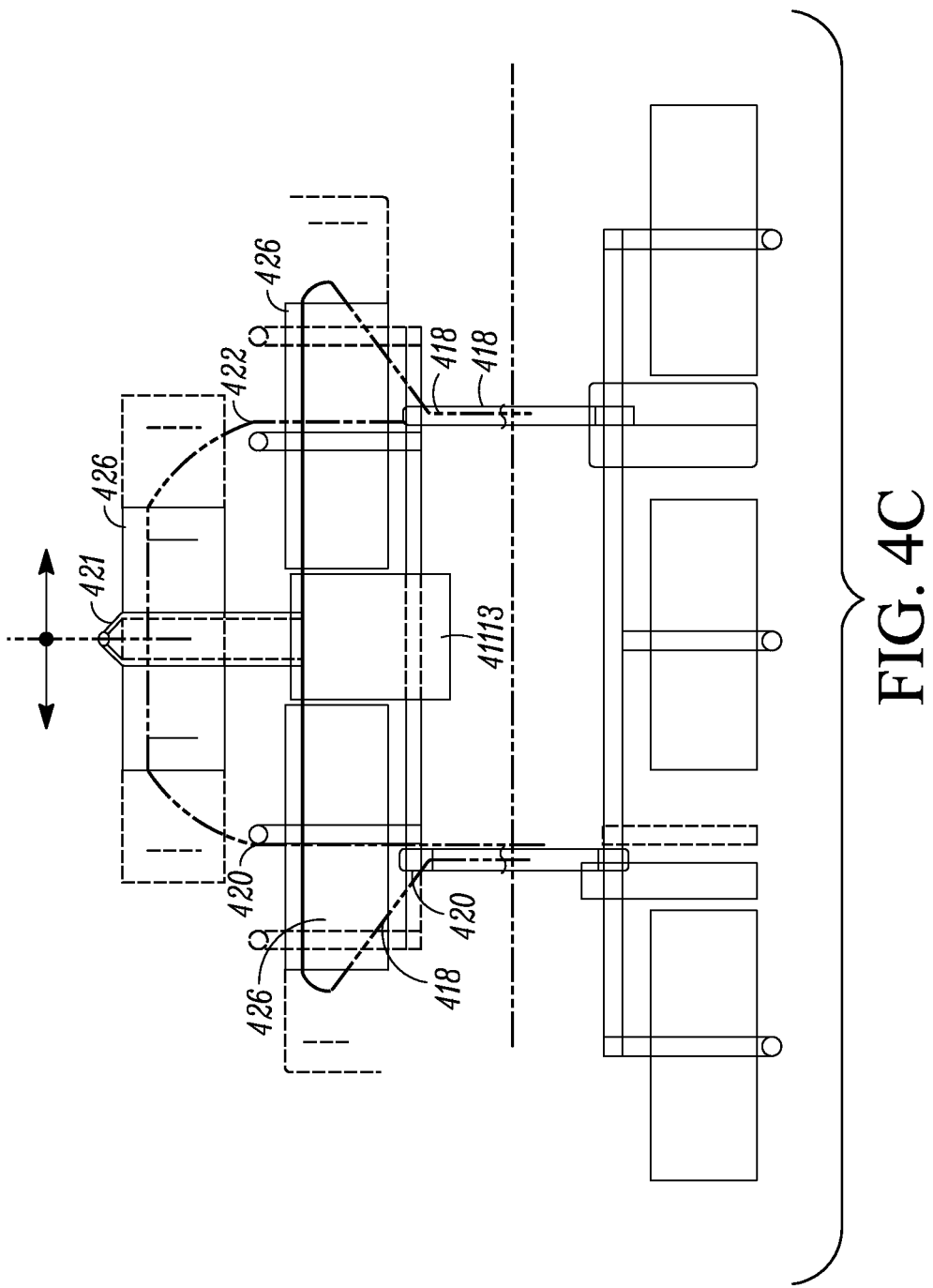

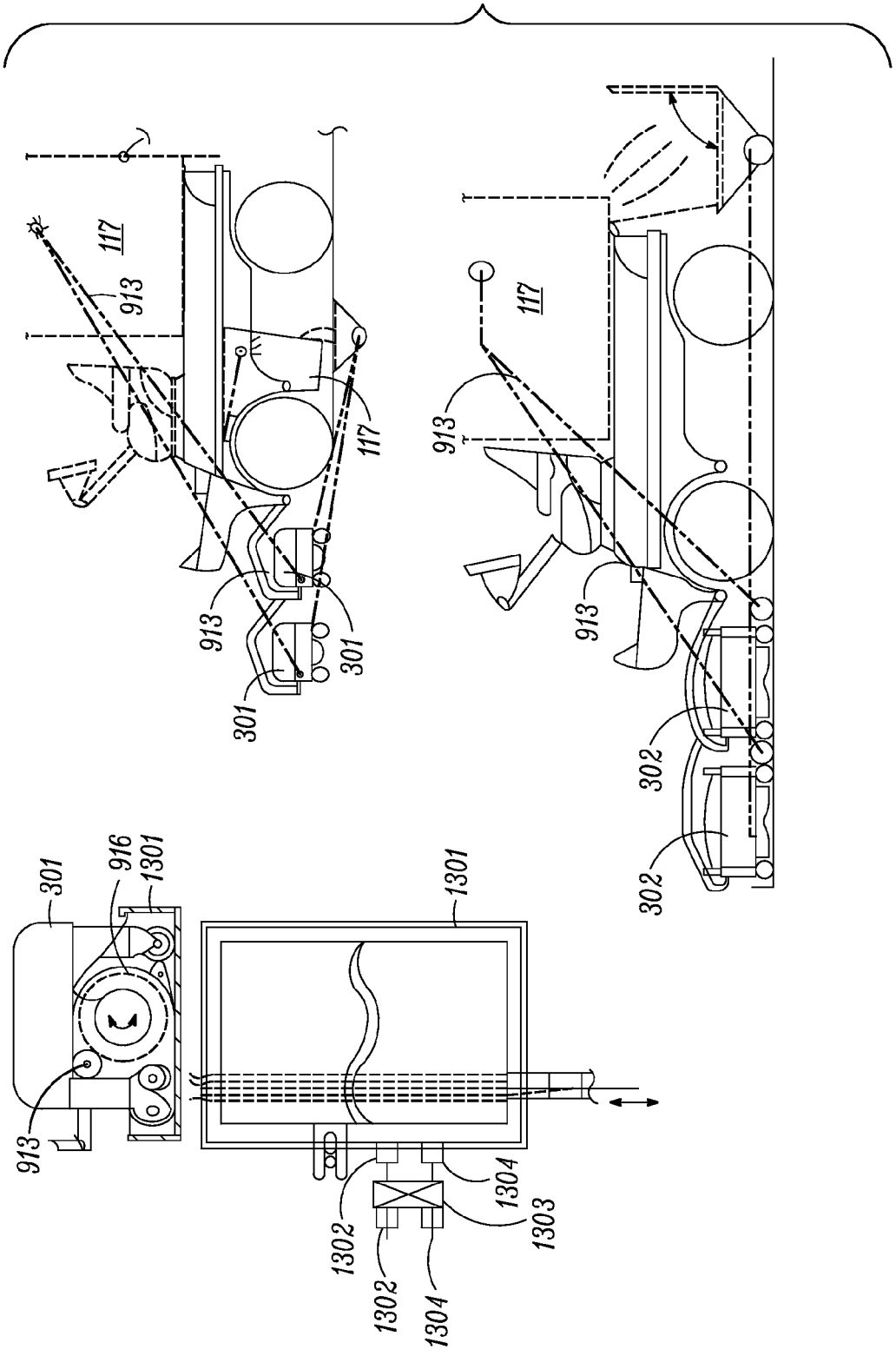

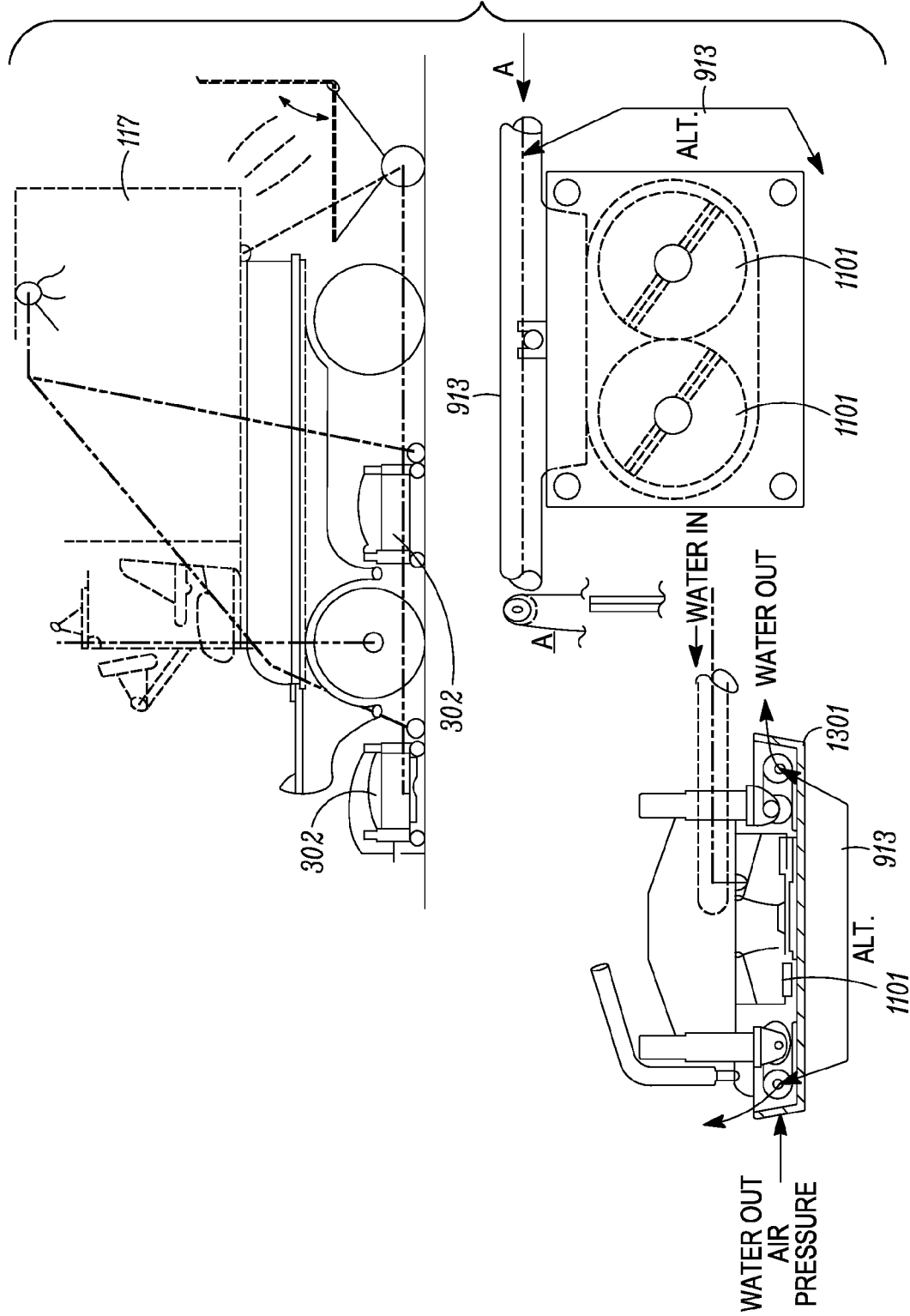

MODULAR LAWN MAINTENANCE MACHINE AND METHOD

CROSS REFERENCE TO RELATED DOCUMENTS

The present invention claims priority to U.S. Provisional Patent Application Ser. No. 61/660,054 of Mauno KESKI-LUOPA et al., entitled "LAWN MAINTENANCE METHOD, SYSTEM AND APPARATUS," filed on Jun. 15, 2012, the entire disclosure of which is hereby incorporated by reference herein.

BACKGROUND OF THE INVENTION

Field of the Invention

The present disclosure generally relates to lawn maintenance systems and methods, and more particularly to methods, systems, machines, equipment, automation, services, and the like, relating to landscaping, golf course maintenance, turf care, and the like.

Discussion of the Background

In recent decades, there have been great leaps of technology in machine and equipment design, and with respect to building such technology with increased use of electronics, electrical devices, information and communications technology (ICT), new types of power sources, automation, autonomous vehicle systems, and the like. However, such technology has not being extensively used in golf course and turf care machines, and the like, nor has a service provider concept and business related thereto been extensively developed.

Therefore, there is a need for further development of such technology with respect to methods, systems, machines, equipment, automation, services, and the like, relating to landscaping, golf course maintenance, turf care, and the like

SUMMARY OF THE INVENTION

The above and other problems with respect to lawn maintenance systems and methods are addressed by the illustrative embodiments of the present disclosure which provide a line of eco-friendly, cleantech and sustainable lawn maintenance machines and systems with aim to develop green golf courses, which is not reality today with current combustion engine and hydraulic machines, which use an excess of fertilizers and other vast variety of chemicals. The mowing and the increase of green speed can be performed on one go with the described mower machines using reel mowing units, a turf improvement roller system, and green speed measuring. The system allows collecting of the speed data (e.g., by GPS) for quality control purposes, and wherein speeds can be programmed to be the same on all greens or with different speeds to increase the difficulty of the game.

Accordingly, in illustrative aspects, there are provided a method, system and apparatus for a lawn or turf care maintenance machine, including at least one of fully electric operation; multi-purpose operation; and overnight, silent operation. The machine can be configured for at least one of golf course maintenance, turf care, landscaping, outdoor work, and transportation.

The method, system and apparatus can further include being lithium-ion battery powered with a battery management system (BMS) and information and communications technology (ICT) systems and programs for providing at least one of quick battery exchange, manual or automatic operation, brake energy recovery, fluid free and silent operation.

The method, system and apparatus can have a worldwide wireless remote diagnoses system, including machine data collection.

The method, system and apparatus can have a high efficiency power train and with interchangeable tires, wheels, planetary gears, servo motors, servo controllers, and drives.

The method, system and apparatus can have system components that are mountable on a plurality compatible frame designs with suitable wheel pattern designs.

The method, system and apparatus can have 3 frame sizes, covering mowing machine applications, including from 3 to 5 to 7 reel and rotary mowing configurations with a mowing width from about 51 to 138 inches.

The method, system and apparatus can have an implement mounting, lifting, lowering and down forcing system, with quick implement changing, and with a manual or motorized side-shifting capability.

The method, system and apparatus can have a multi-purposes design for providing a plurality of lines of machines, wherein a plurality implements are mountable in front, rear, both sides, and under and above configurations, and forward and reverse operating and driving directions.

The method, system and apparatus can have interchangeable mowing units, including reel and rotary units with electronic programmable cutting height, reel and rotary rotation speed and travelling speed of the machine or cuts per meter.

The method, system and apparatus can have result measurement devices for measuring results of mowing operations and an automatic clippings collection and dispersing system.

The method, system and apparatus can have a system for at least one of sharpening, washing and drying mowing units without removing the mowing units from the machine.

The method, system and apparatus can be configured to perform a plurality of jobs for golf course maintenance and turf care in addition to mowing and related jobs.

The method, system and apparatus can be configured as an 11 to 15 wheel, multipurpose machine, including an 11 wheel feeder machine or a 15 wheel carrier machine having interchangeable drive systems and wheel patterns.

The method, system and apparatus can be configured for seed, fertilizer, and pesticide distribution and with distribution needs analyzed with sensors attached to mowing units, and with collected data being transferred wirelessly to an information system, and mapped via GPS.

The method, system and apparatus can be configured as operator driven machines that are retrofittable to operate in an autonomous manner or configured to operate in an autonomous manner.

The method, system and apparatus can include a location-based system for providing automatic steering, and with a data capture system for capturing data for seeding, fertilizing, pesticides spreading, weed control, and irrigation needs.

The method, system and apparatus can include a wireless remote diagnoses system, operating system, and material data collections system.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present disclosure are illustrated by way of example, and not by way of limitation, in the figures of the accompanying drawings and in which like reference numerals refer to similar elements and in which:

FIGS. 4B-4C show a system for side-shifting of implements using the interchangeable implement lifting and lowering system;

FIGS. 13A-13B show an automatic and programmable mowing unit washing and drying operation;

DETAILED DESCRIPTION OF THE PREFERRED EMBODIMENTS

Figure 1A:
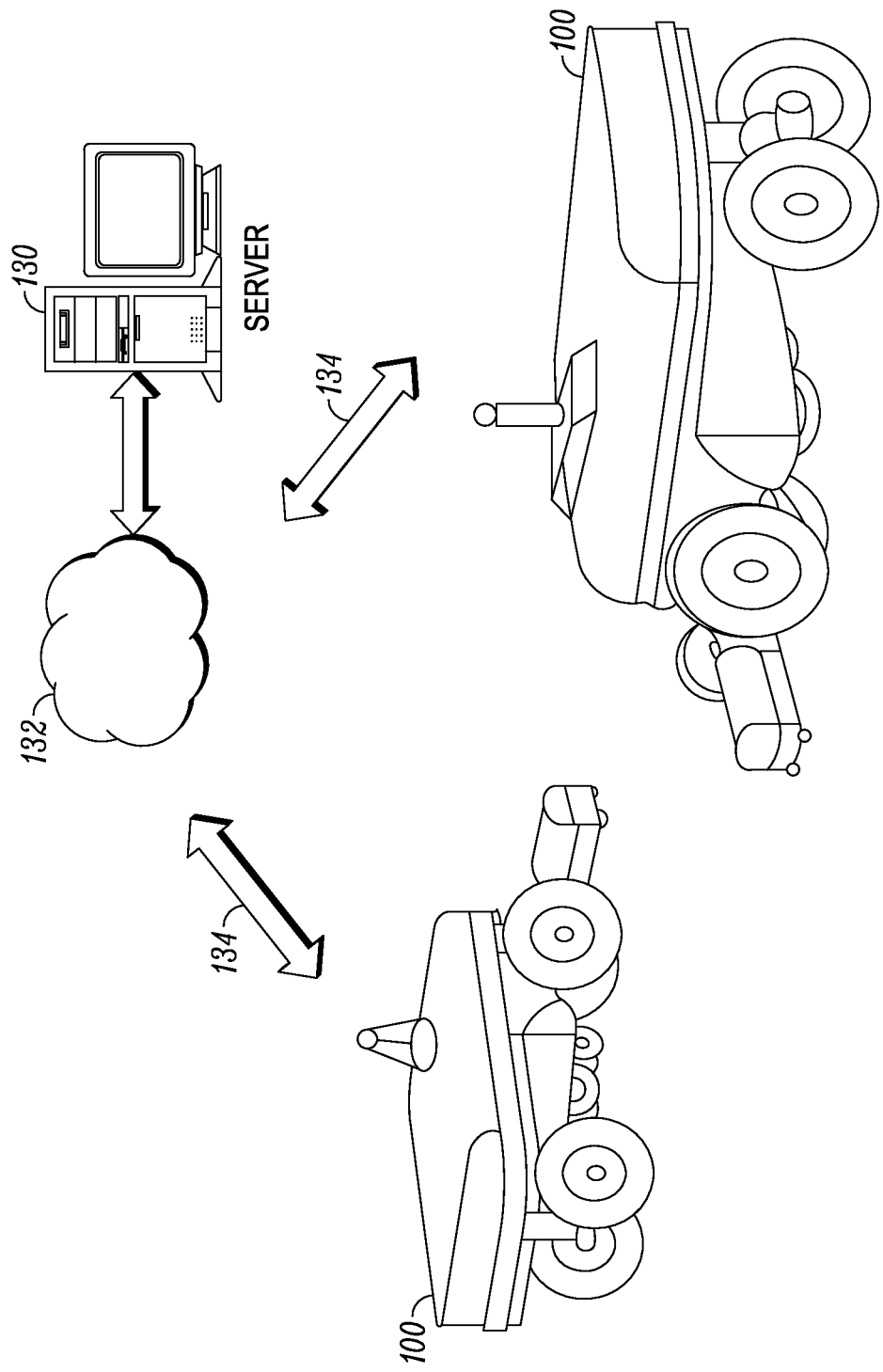
FIG. 1A shows machines and vehicles to improve landscape, golf course and turf care maintenance and operations and other outdoor work, according to an embodiment of the present invention.

Generally, the present disclosure is directed to a new innovative, eco-friendly, sustainable, emission free, line of fully electric and silent, multi-purpose machines, equipment, services, and the like, for landscape, golf course maintenance, turf care, and the like. Such machines are mainly outdoor working machines and vehicles, with manned or unmanned autonomous operation, and built with remote wireless diagnoses, services, and the like, including a service provider system to perform a full range of service, and provide a work package coupled with leasing options to provide a service agreement with a one invoice per month package.

The present disclosure includes recognition that technology in machine and equipment design, and with respect to building such technology with increased use of electronics, electrical devices, information and communications technology (ICT), new types of power sources, automation, autonomous vehicle systems, and the like, has not being extensively used in golf course and turf care machines, and the like, nor has a service provider concept and business related thereto been extensively developed. The present disclosure further includes recognition that sustainability, eco-friendly designs, cleantech, environment and energy savings, and the like, are issues and requirements to be addressed for future developments.

In this respect, manufacturing of golf course mowing and related equipment is monopolized worldwide by handful of large, multi-billion dollar corporations, which merely watch and follow each other, without making technology leaps, and innovations, in order to limit risks. Accordingly, there are no newcomers in such markets, whereby golf industry customers, especially in Europe, are expressing that there are really no new innovations available, and that machines are basically built using decade old technology.

For example, golf course and other turf care machines, and the like, are mainly designed and built under the principle of employing one type of machine for each job, where each machine is built using different components, which requires an extensive selection of components, resulting in high costs for stocking, production and services, large amounts of required storage space for manufacturing, as well as at the premises of the customer. In addition, component standardization has been neglected in such design and manufacturing.

Further, as each job employs a different machine, there are employed a large number of different types machines, working and driving around the working areas and therebetween. By contrast, the present disclosure is directed to employing multi-job machines, built with multiple implements, for performing such jobs in one go, resulting in efficient work, lowered investment costs, and less trampling of the turf, less cultivation being needed, and the like.

Moreover, conventional turf care machines, and the like, are mainly built with combustion engines and extensively hydraulics, resulting in high emissions and energy consumption, as well as service and repair costs. In addition, such machines are prone to high energy costs, and energy leakage. Accordingly, the work performed by such machines cannot be considered as eco-friendly cleantech golf course maintenance, and turf care.

Still further, golf course operators want to have their courses open and free for game play and without maintenance machines interrupting the game play and causing combustion engine noise, and the like. By contrast, the present disclosure is directed to employing machines that can be programmed to work early in the morning or during the night, advantageously, increasing revenues from the more rounds golf that can be played. In addition, golf courses and turf care areas are normally nearby houses and/or resorts, hotels, and the like, so that combustion engine based machines with high noise levels cannot work at night, because they would disturb people living and sleeping nearby. In addition, in quite a number of countries in Europe, landscaping, golf course maintenance, turf care, and the like, combustion engine based machines are prohibited during weekends due to the high noise levels caused by such machines.

Accordingly, the competition between golf courses, and the ever increasing costs, will force golf courses to improve their efficiency, and increase the number of paid rounds and turnover. By contrast, the present disclosure is directed to employing automation, and autonomous silent, emission free, machines that address the above and other discovered problems with conventional machines, advantageously, attracting high paying customers, and providing noise and machine free greens, cleantech golf courses, and the like.

In addition, there is a need for a high green speed, which is an important parameter for rating golf courses. This can be achieved by cutting greens very short or by employing leveling rollers. However, cutting the greens very short stresses the grass, and the use of leveling rollers is an additional job to be performed, resulting in increased costs.

Further, there are number of jobs, seeds, fertilizers, chemicals, top-dressing, and the like, that are used in golf courses beyond merely mowing. Each such job requires a specific machine and operator, and such jobs result in trampling of the turf and the application of materials in an inaccurate manner. By contrast, the present disclosure is directed to employing multipurpose machines that perform such jobs in an accurate manner, by employing electronics, electrical devices, programming, ICT systems, automation, and the like, resulting in accurate navigation, and efficient and precise golf course maintenance, turf care, and the like. In addition, such electronics, electric devices, programming, ICT systems, automation, and the like, has not been extensively used in golf course and turf care machines, nor has a service provider concept and business been extensively developed.

Referring now to the drawings, wherein like referring numerical designate identical or corresponding parts throughout the several views, and more particularly to FIG. 1A, thereof there is illustrated an example of a golf course maintenance machine, according to an illustrative embodiment. In FIG. 1A, one or more machines 100 can be coupled via wireless communications links 134 and communications network 132 to a server 130 of a service provider for performing remote diagnosis and any other suitable functions, and the like, as further described.

Figure 1B:
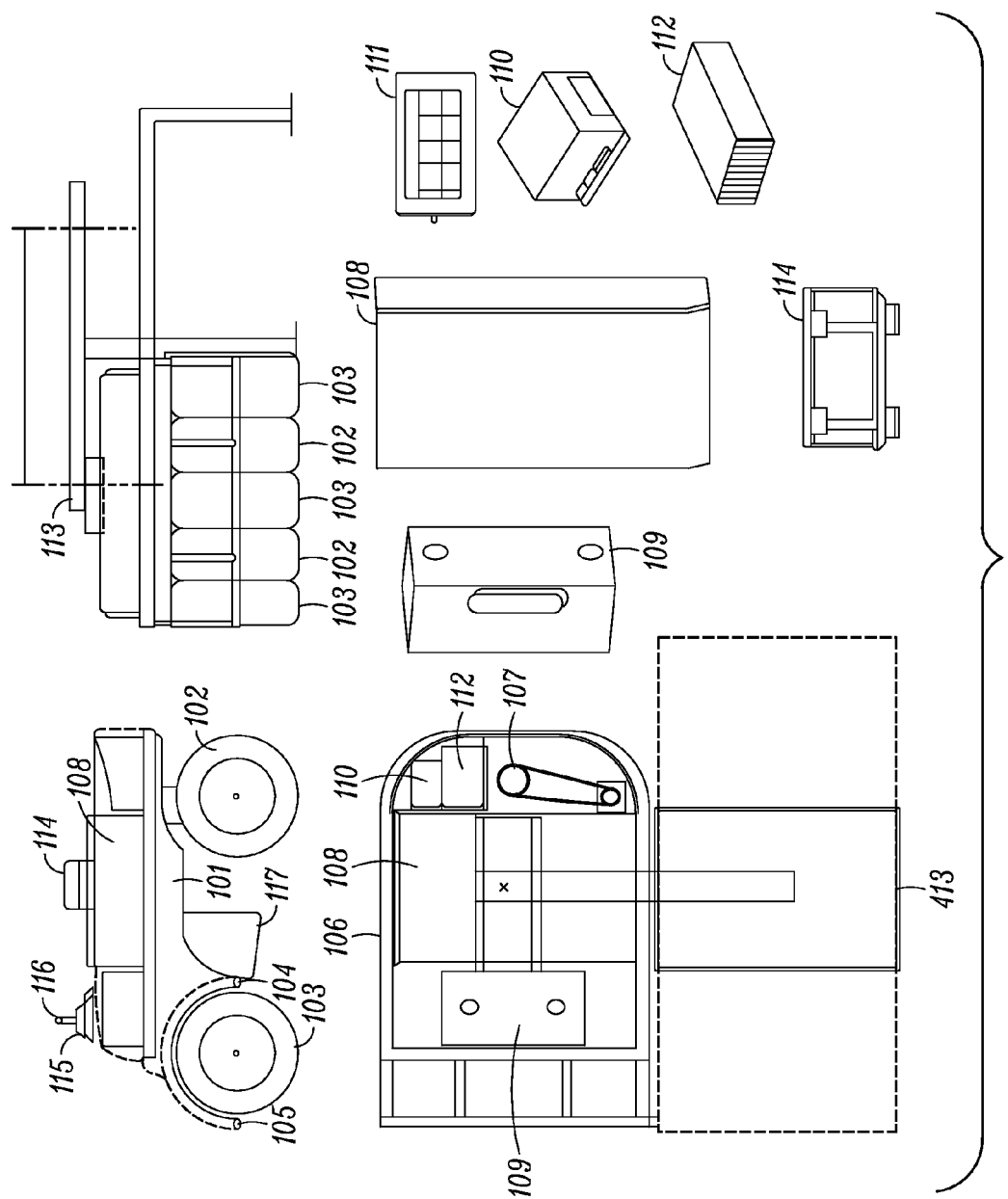
FIG. 1B shows examples of frame, electronics, electric battery powered with manual or automated quick exchange battery pack, autonomous or operator driven machines built with wireless remote diagnose operating control for the improvement of after-sales-service to increase machine utilization rate and for collection of operational data for service provider purposes.

FIG. 1B shows an illustrative embodiment of the electric, electronic, automation, and service provider based, autonomous working machine system 100 of FIG. 1A. In FIG. 1B, the machine system 100 can include a machine frame 101, a steerable rear wheel system 102 described with respect to FIGS. 1B and 2, front wheel system 103 described with respect to FIGS. 1B and 2, implement mountings 104 and 105 described with respect to FIGS. 1B, 4, 7 and 8, implement mounting hollow rectangular tube 106 described with respect to FIGS. 1B and 8, and steering system and column 107 described with respect to FIGS. 5 and 6.

Figure 9A:
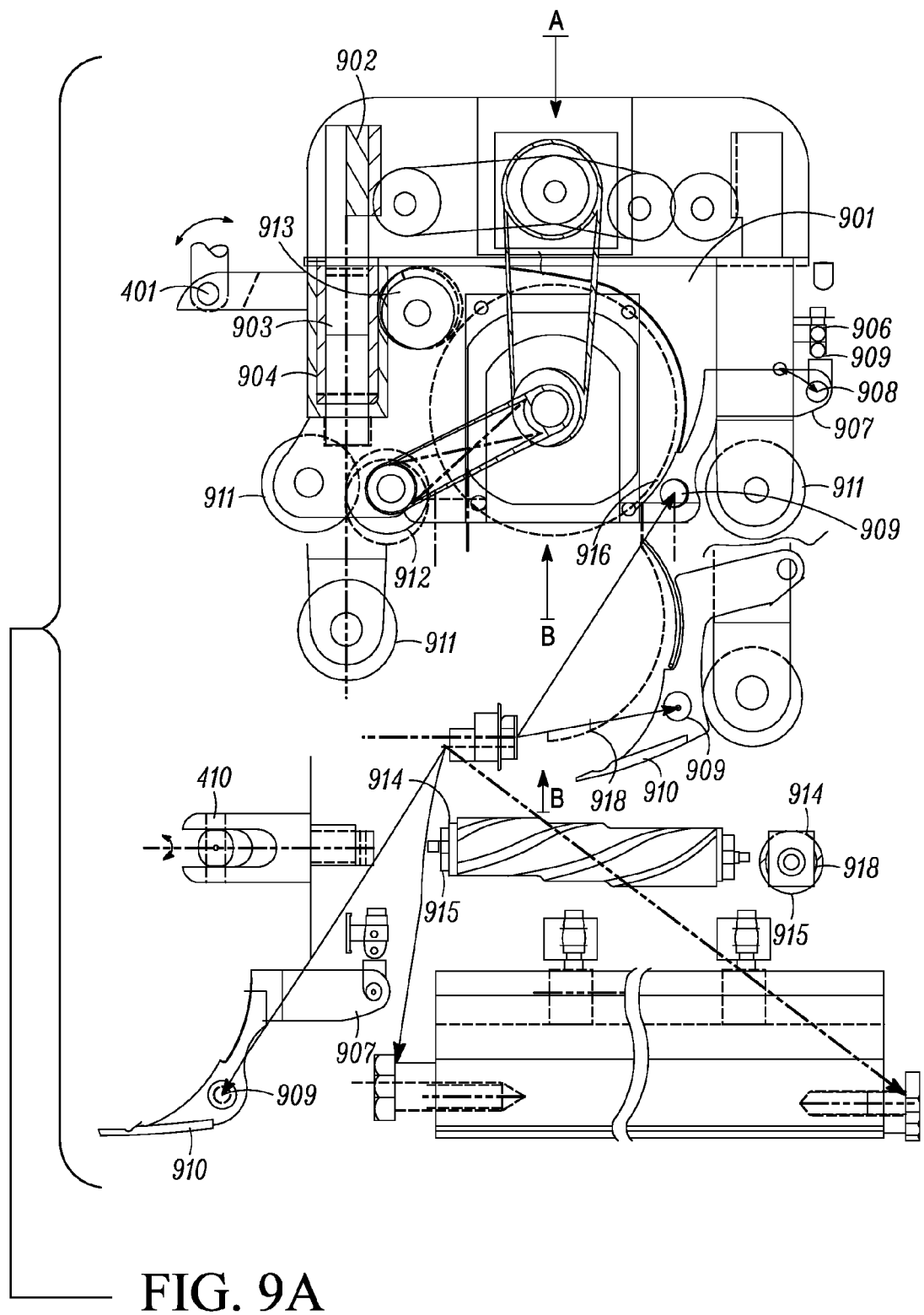
FIGS. 9A-9B show a reel type mowing unit with programmable cutting heights and reel speeds and clippings collection.
Figure 9B:
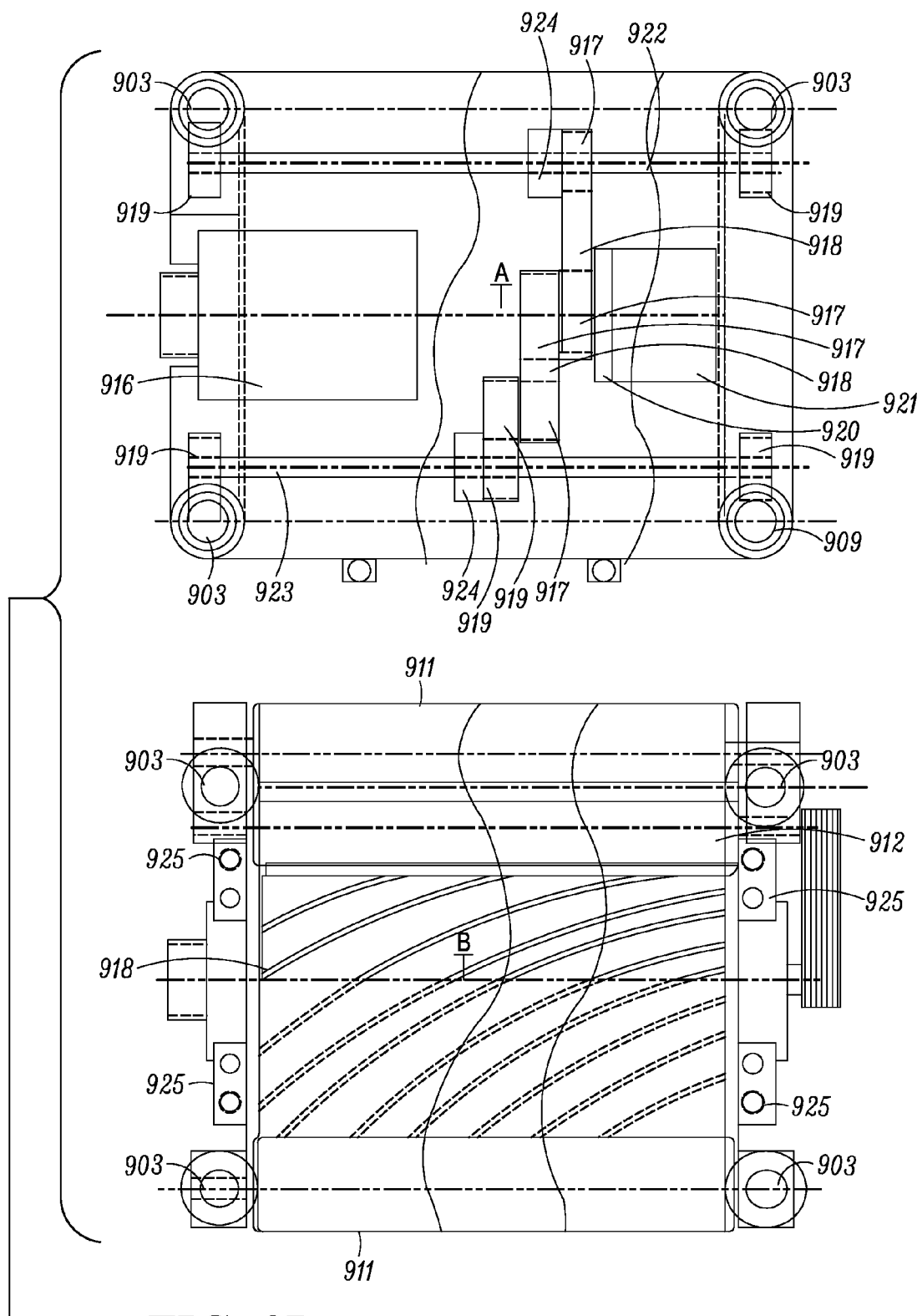
Figure 10A:
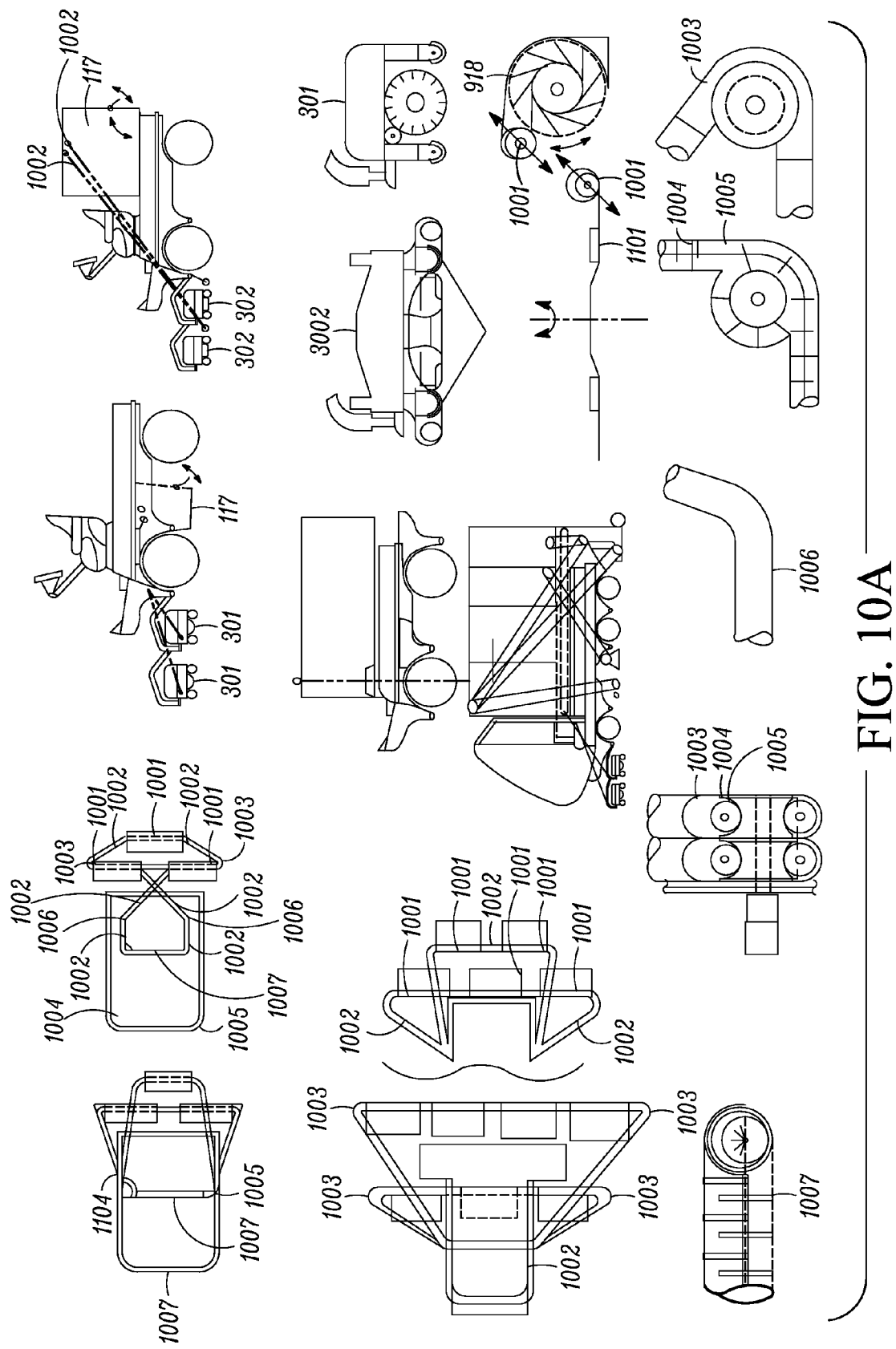
FIGS. 10A-10B show an automated clipping collection and dispersion system, which result in silent mowing of greens, fore-greens, collars and Tées with the machine of FIGS. 9A-9B configured for one pass operation.
Figure 10B:
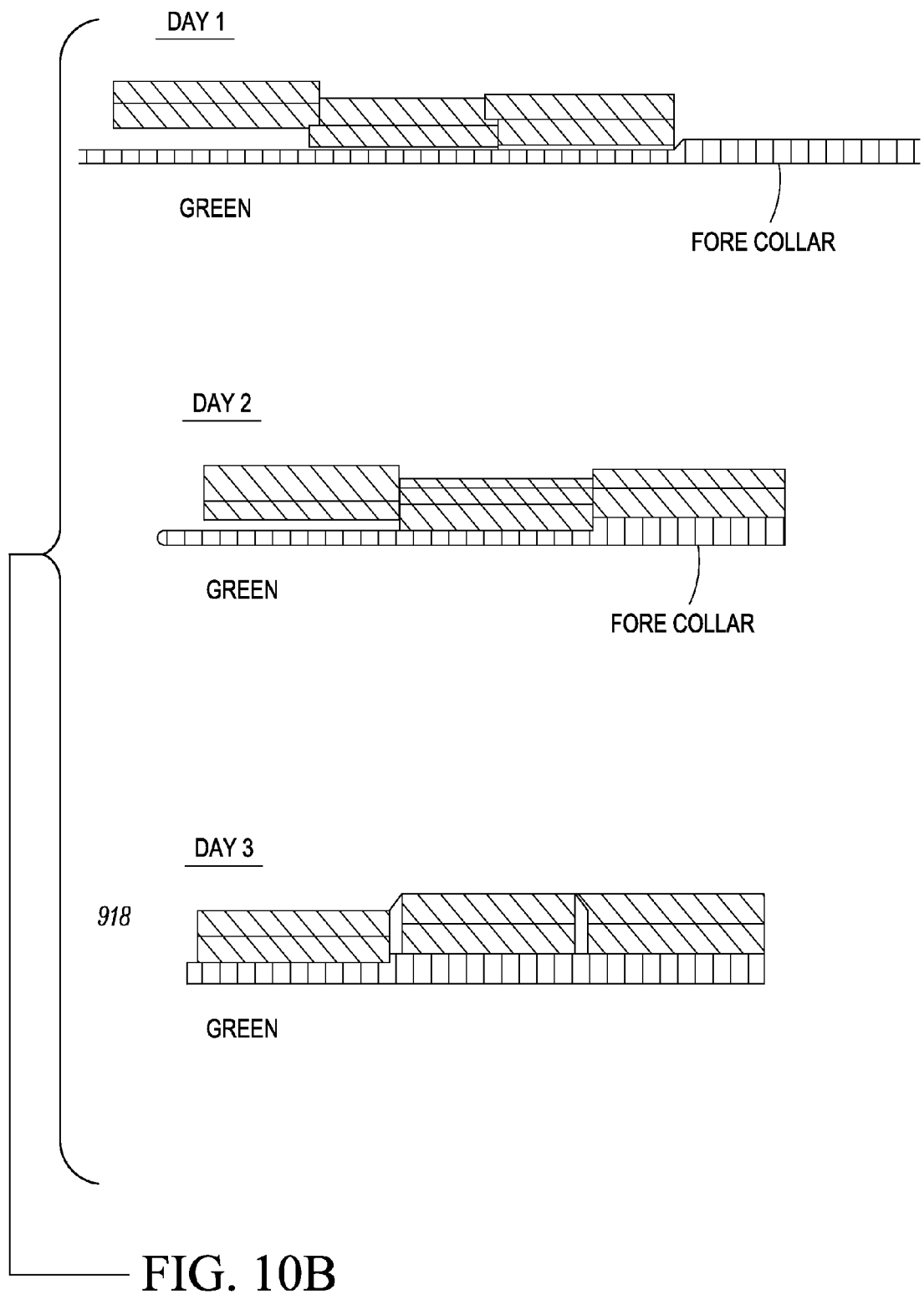

The machine system 100 can further include quick exchange battery pack 108, electronics box 109 including central computer, internal and external communication systems, data collection with remote wireless diagnoses and service provider systems and programs, autonomous working machine electronics and programs, Battery Management System (BMS) 110 for controlling the battery pack system, touch screen user interface 111 for operating system (not shown) and wireless communication system (e.g., GSM, 3G or 4G, smart phone, etc.), charger 112, manual/automatic battery pack quick exchange system 113, battery pack lifting unit 114, receiver/antenna 115 (e.g., VRS GPS/GLONASS/GALILEA, etc.) and receiver/antenna systems 116 (e.g., VRS GPS/GLONASS/GALILEA, etc.) for autonomous machine operation and data collection for the central computer or server 130 and suitable computer programs thereof (not shown), clippings collection box 117 of an automatic clippings collection and dispersion system described with respect to FIGS. 10A-10B, and programmable cutting height selection and rotation speed programming systems described with respect to FIGS. 9A-9B. In further illustrative embodiments, the batteries of the machine 100 can be charged using suitable solar panels (not shown) located on the machine 100 and/or at a charging station.

The touch screen user interface 111 can include cellular phone, smart phone, and the like, functionality (e.g., Nokia, Windows, Android, Apple based, etc.). Advantageously, when starting the machine 100 for the first time, operators can uniquely identify themselves, for example, via a user login and/or bio-metric system having suitable readers (e.g., finger print, iris, facial, etc.) of the user interface 111, whereby suitable machine operating and safety instructions can be displayed on the user interface screen to the operator. In this way, the operator can confirm reading and understanding of the instructions in order to put the machine 100 in an operating mode. On subsequent operation of the machine 100, the operators can digitally sign in via the user interface 111 by identifying themselves via login and/or the bio-metric system. Advantageously, such functionality can be used to reduce of accidents, and prevent miss-use, theft, and the like, of the machine 100. In addition, such functionality can be used for operator efficiency rating, bonus payments, identifying accident prone operators, and the like.

The electric and electronic battery system with quick exchange battery pack provides for lower machine weight, and reduces aeration, ground trampling, and the like, due to the reduced wheel loads, and can use of braking energy to charge the battery pack. Advantageously, this can increase operation time between battery charging and reduce energy costs for increased sustainability.

Figure 2:
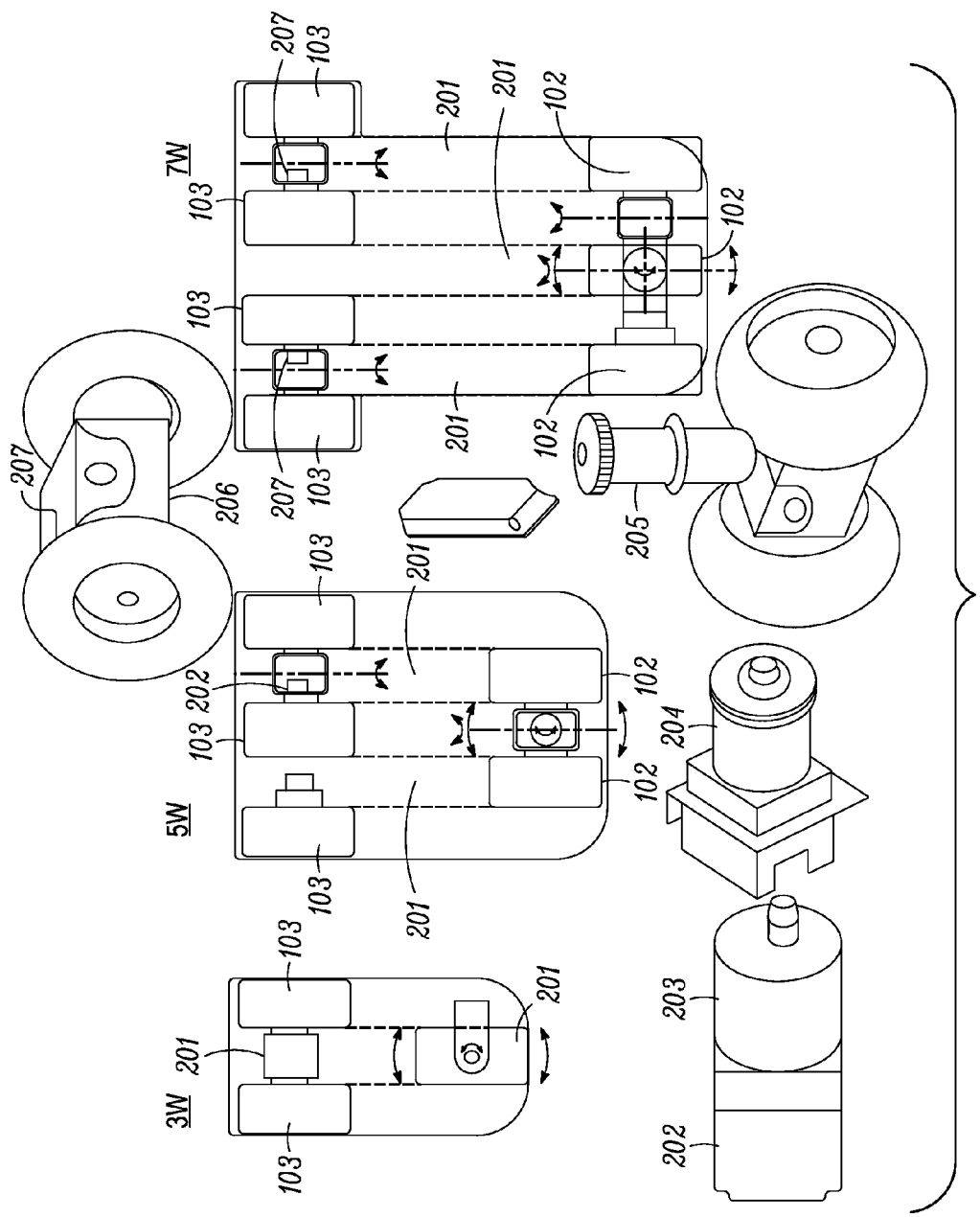
FIG. 2 shows interchangeable drive and steering on 3-, 5- and 7-wheel vehicles and machines.

In FIG. 2, various wheel patterns 3, 5 and 7 are shown for the frame 101. Wheels 103 in the front are followed by wheels 102 in the rear for tracking the free space 201 left by the front wheels 103. Advantageously, this provides leveling of the ground without leaving individual tire tracks, and with the load being evenly distributed and with a larger area of wheel prints on the ground due to the higher number of wheels, as compared to conventional machines.

In FIG. 2, the interchangeable drive power packs are described with servo motor 202, planetary gear 203 built into interchangeable drive unit 204 and placed inside interchangeable double wheel steerable power pack 205 and interchangeable double wheel none-steerable power pack 206. In this way, the wheels follow the ground by the swiveling of the double wheel bodies 205 and 206 via interchangeable servo controller 207, which can control various sizes of servo motors employed. Accordingly, interchangeable units can be used, for example, on 9, 11 to 15 wheel machines, as further described with respect to FIG.

14. Interchangeable power packs 205 and 206 can include interchangeable wheel rims, wherein the tires can employ a smooth surface or any suitable pattern according to the job. For automated quick return steering, the center wheels in front can raise up by raising unit 207, whereby the machine 100 can turn around a center point between the outer front wheels, without causing wheel marks on the ground, and for speeding up the work process.

Figure 3:
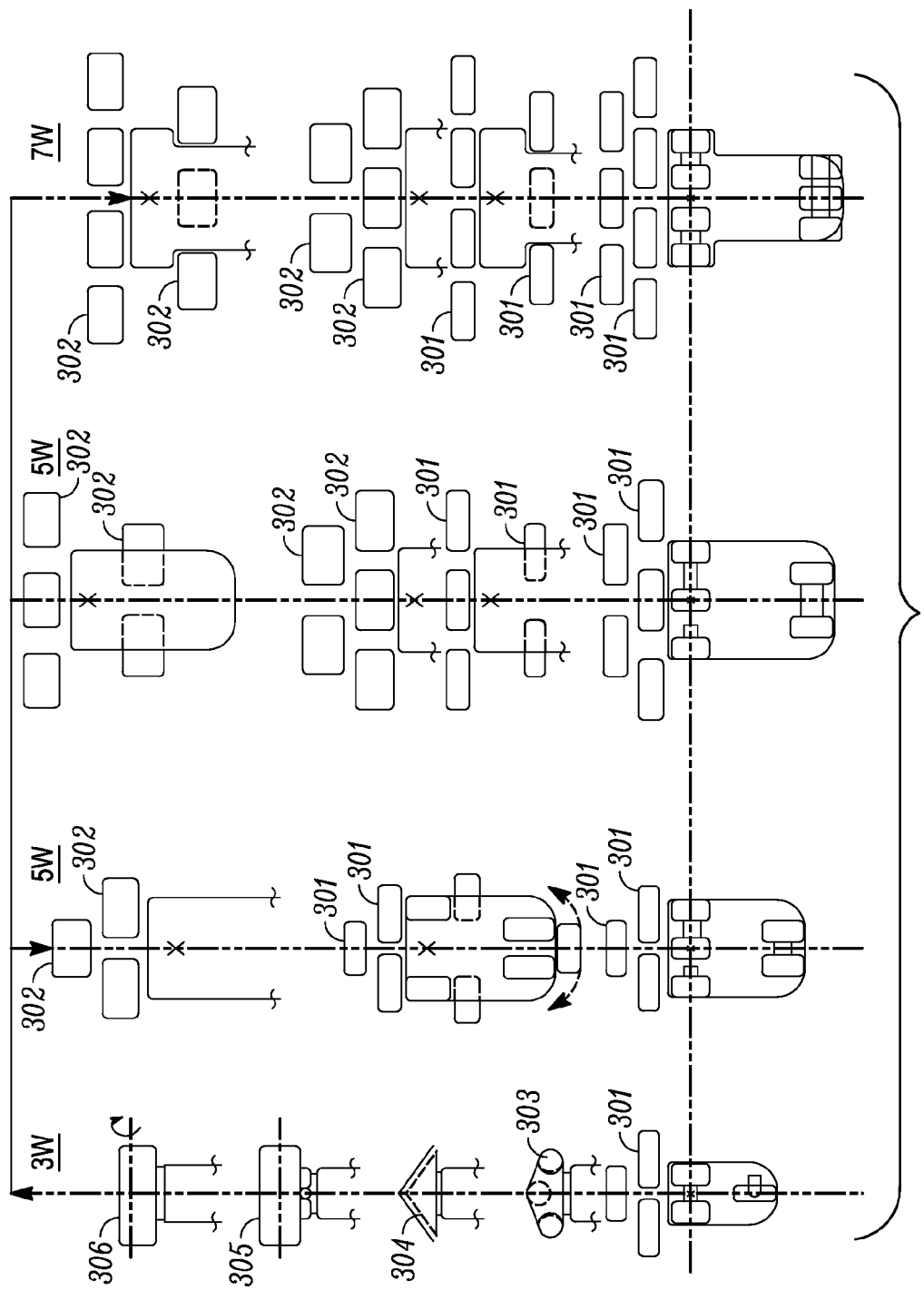
FIG. 3 shows different mounting of reel and rotary mowing units or other implements on type 1, 2 and 3 machines.

In FIG. 3, different mowing units, including reel 301 and rotary 302 mowing units and/or illustrative implements (e.g., designed for different frames and wheel patterns from 3 to 7 wheel machines), such as fixed deck rotary mowing 303, snowplow 304, snow blower 305, brushing 306 units are shown on the various frame sizes and numbers of wheels (e.g., 3, 5 or 7 wheel), and which allow for operator visibility (e.g., as shown marked with an "x") to the outer edge of the outer mowing units. Reel mowing mechanism 301 is further described with respect to FIGS. 9A-9B, and alternatively rotary mowing decks/units 302 are further described with respect to FIGS. 11A-11B. Reel 301 and especially rotary 302 mowing units and other implements can be built with an automatic clippings collection and dispersing system with respect to FIGS. 10A-10B, and can be modified in other applications. The machines with the 5 wheel configuration can have a 4 or 5 wheel drive with different battery pack sizes, according to the job being performed.

The machines of FIG. 3 can also be built with the configurations, where the outer mowing units are placed outside and in line with front wheels on 5 wheel and 5 mowing unit and 7 wheel and 7 mowing unit machines. Whereby one 5 wheel and 5 reel mowing machine can perform the mowing of greens, semi-greens/collars, Tees, fairways, and the like.

The 5 wheel machines of FIG. 3 can be built with longer wheel base, for example, as 7 wheel machines, and with an added capacity battery pack system. Instead of the bigger capacity battery packs, the automatic or manual quick exchange battery pack systems can be used to extend operating times. Advantageously, additional implements can be added, according to examples further described with respect to FIG. 8. In addition, the machines 100 shown on FIG. 3 can be built using well over 90% and up to 95% interchangeable components, resulting in reduced manufacturing costs, outsourcing, training, after sale servicing, logistics, and the like.

Figure 4A:
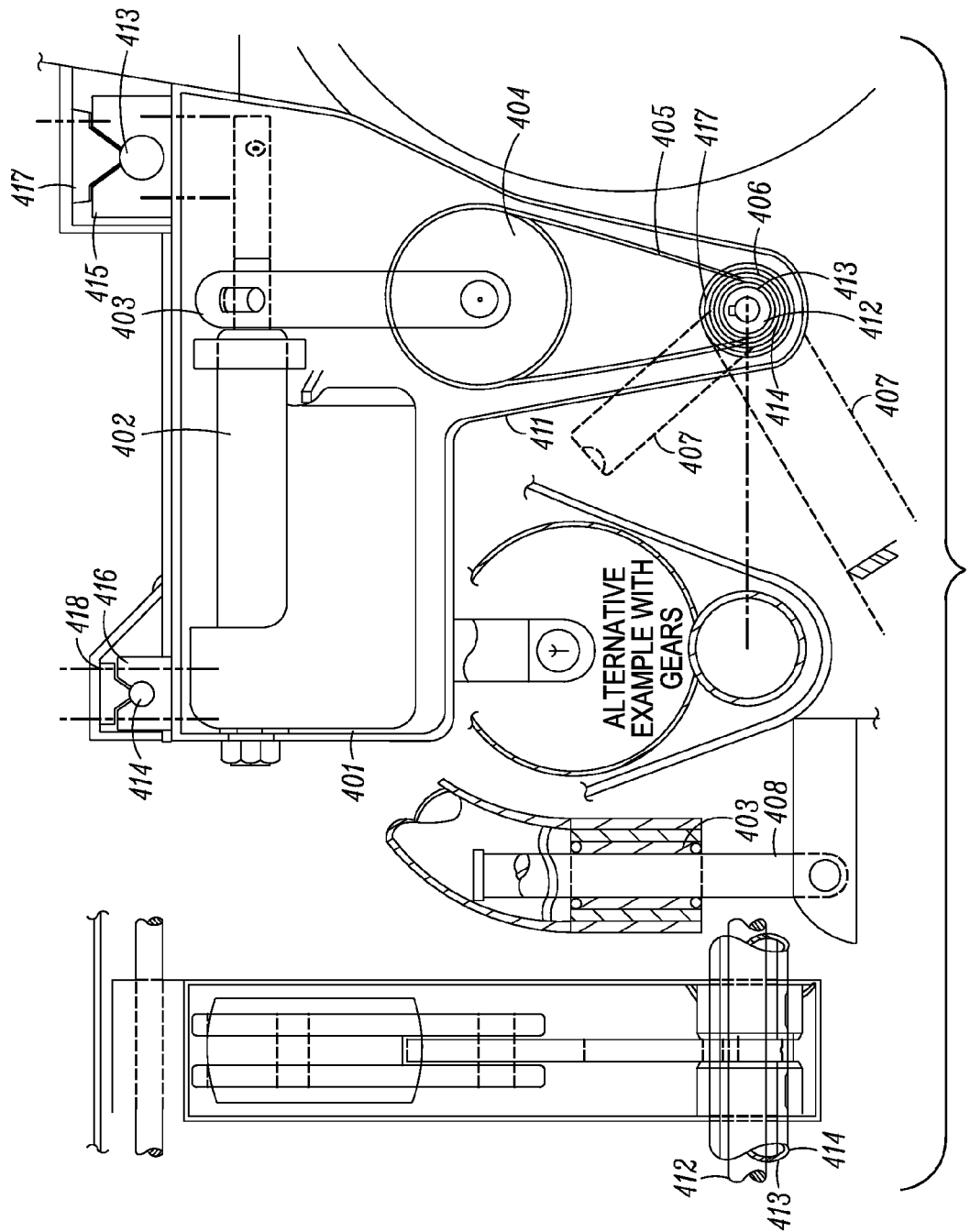
FIG. 4A shows an interchangeable implement lifting and lowering system with quick exchange of implements.

FIG. 4A shows an interchangeable implement lifting/lowering system 401 with a built in feature of subjecting implement down force and with innovative quick implement exchange and side-shifting. The system 401 includes linear motor 402, moving lever 403 that is pushed and pulled by linear motor 402, and which turns pulley 404. The system 401 further includes timing belt 405 turning pulley 406, whereby implement mounting arm 407 can move up or down to lift or lower implements fixed on swivel joint shaft 408, which moves up and down inside linear slide bearing 409 for automatic implement ground tracing and lifting and lowering, as further described with respect to FIGS. 7A-7B. The lifting/lowering system 401 is mounted on frame 411. Tempered and ground shaft 412 is mounted on the machine frame 411 at both ends with mounting units. Linear slide bearing or ball bushing or bearing bushing 413 allows the outer round tube 414 to turn around shaft 412 on lifting and lowering action. The square hollow tube (not shown) is fixed on tube 414 and rotates with tube 412. The fork (not shown) is fixed on mounting arm 407 and locking device 417 and allows implement mounting arm 407 to be changed quickly, resulting in quick changing of implements. Alternatively tube 414 is built with welded locking key 417, as shown on FIG. 4B, and implement mounting arms 407 can be locked in a desired position. Supports 427 mounted on machine frames 101 shown in FIG. 1A are built with a ¾ slide bearing that allows shafts 414 to slide during side shifting, advantageously, providing additional support and rigidity to the system.

Figure 4B:
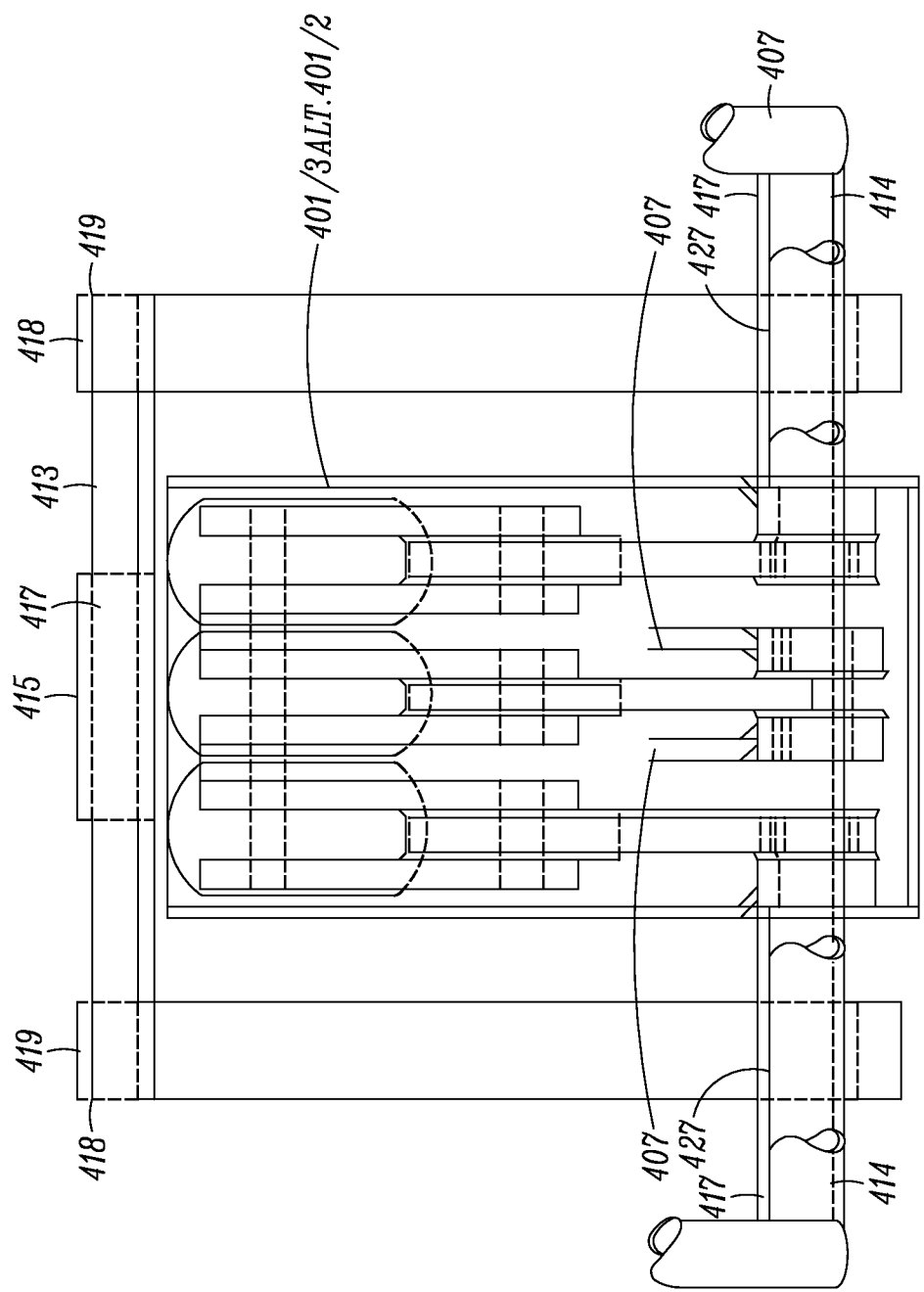

FIG. 4B shows 3 units 401 built into a 3 unit system 401/3 or alternatively a 2 unit system 401/2 (not shown) to perform 3 or alternatively 2 implement raising and lowering operations with down forcing and/or manual and/or motorized (not shown) side-shifting. The innovative side-shifting uses shafts 413 and 414 and linear slide bearings units 415 and 416 to allow the bolted assembly 411 to slide on shafts 413 and 414 at the top thereof via shaft fixing units 418 and 419 shown in FIGS. 4B and 4C, and shaft support 417 and 418 fixed on the machine frame thereabove. Accordingly, the assembly 411 can slide sideways, whereby implements can be moved sideways, according to job requirements, either manually or using a linear motor or other suitable motor system, and the like, by an operator and/or in an automated mode on autonomous machines.

FIG. 4C shows an example of a system, wherein the 3 piece assembly 411/3 of FIG. 4B is mounted on shafts 412 and 414, and forming the implement side-shifting system. The implement mounting arms 407 on FIG. 4A are replaced with implement mounted arms 420, 421 and 422, wherein various implements 426 can be side-shifted manually and/or in a motorized manner, and the like.

Figure 5A:
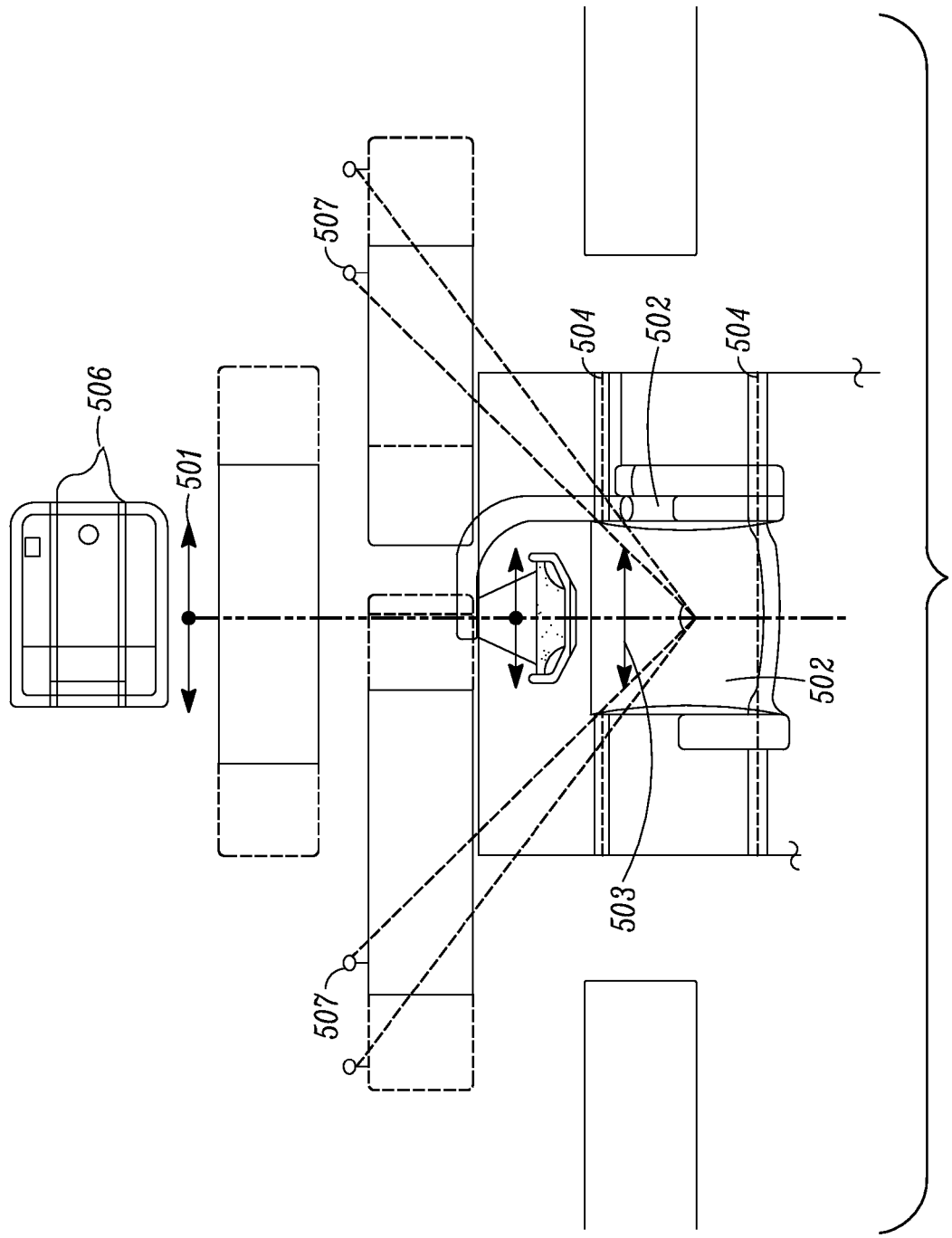
FIG. 5A shows an implement and seat and steering column side-shifting system.

FIG. 5A shows side-shifting subsystem 501 as seen from seat 502 of the operator. In FIG. 5A, the seat and steering column can be adjusted, as indicated by dashed lines, so to provide a proper fit for the operator. Element 503 shows side-shifting of the seat 502 to assist operation by employing front railings 504 and rear railing 505 under the seat 502 in a manual or motorized manner. A chain, rope, indicator 507, and the like, hang down and can act as an operator assistor, wherein outside areas thereof implement a working area for the operator and raise the quality of work in progress.

Figure 5B:
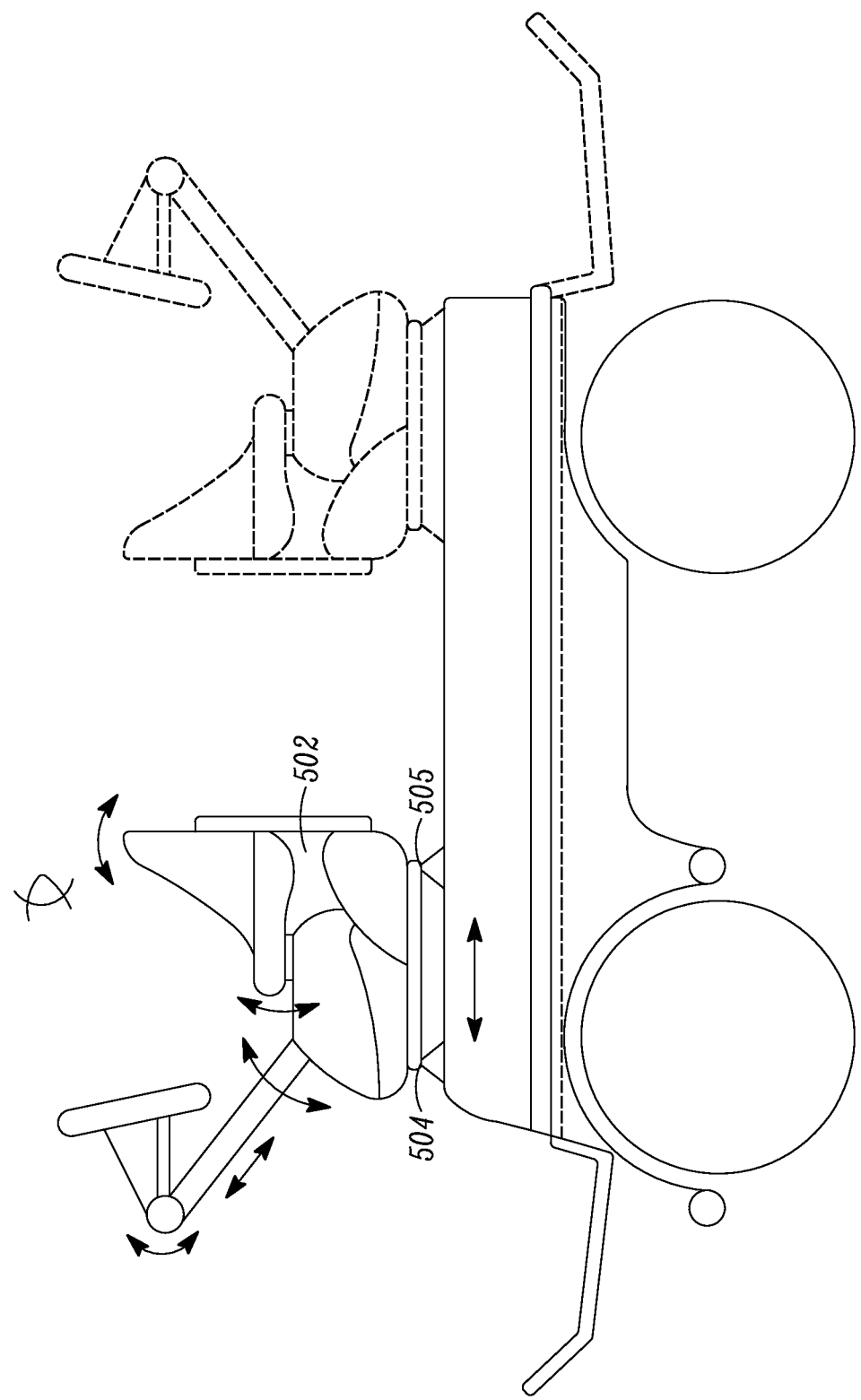
FIG. 5B shows alternative mounting of seat and steering column for implement pushing or pulling operations including tractor functions.

FIG. 5B shows that the seat and steering column 502 can be placed in a forward driving mode for pushing the employed implements forward or in a rearward driving mode for applications employing the machine 100 as a tractor and/or for pulling various types of implements. Rectangular hollow tubes 506 are employed for fixing the seat and steering column 502 to the frame of the machine 100 towards a suitable direction based on a given application and/or job. Advantageously, the seat and steering column 502 can be easily replaced with suitable electronics, programs, antenna/receiver systems (e.g., VRS GPS/GLONASS/GALILEA, etc.), and the like, as described herein, so as to transform an operator driven system into autonomous, unmanned system at later date.

Figure 6:
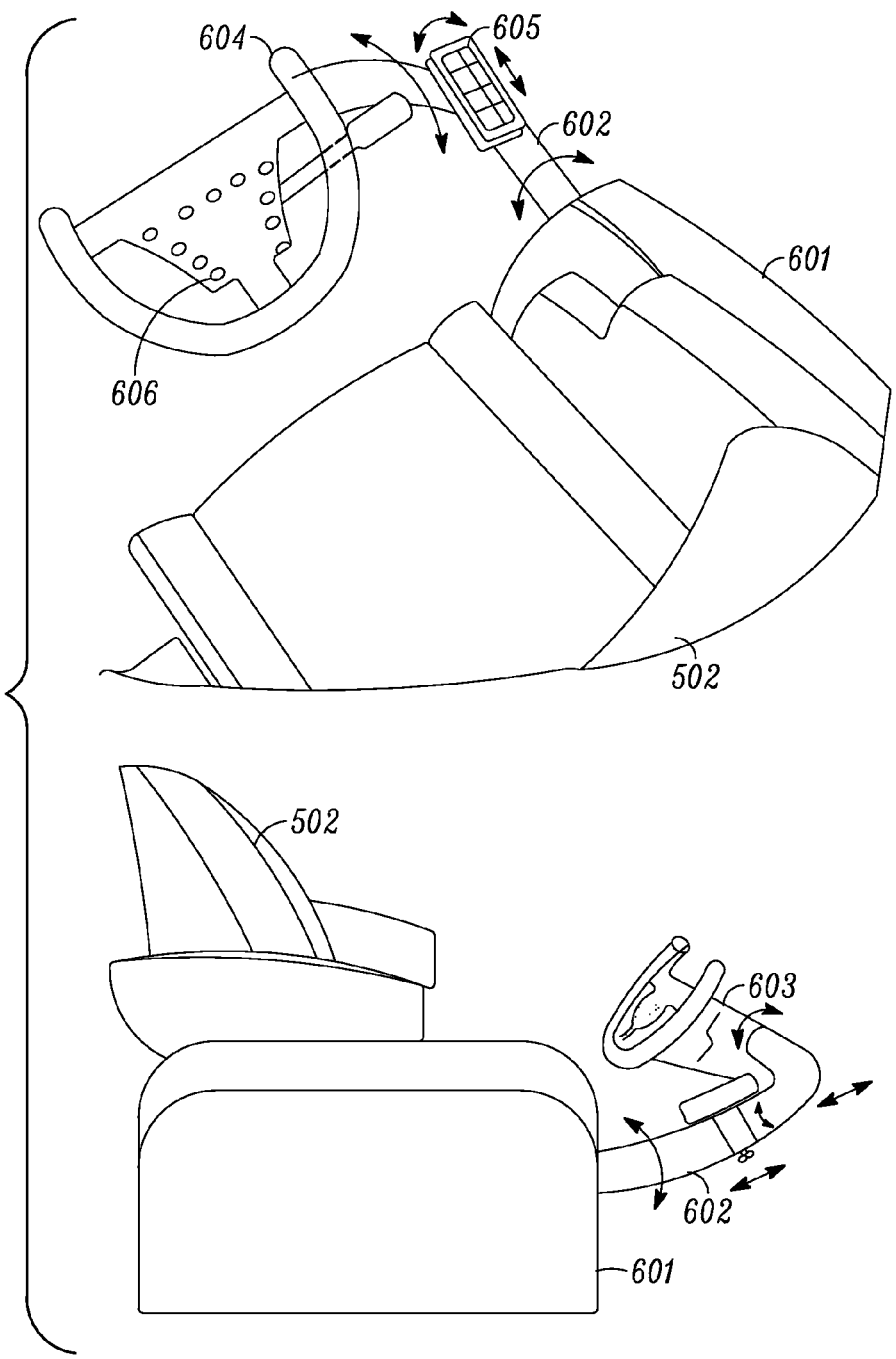
FIG. 6 shows seat and steering column design with wireless communications.

FIG. 6 shows the seat 502 with a steering column assembly 601, wherein examples of various steering column adjustments are shown. The steering column mounting 601 includes position adjustments and electronics and a tubular steering column support tube 602 for installing employed electrical wirings, and the like. Further shown are steering column box 603, and steering wheel 604 with touch screen 605 and/or smart phone interface for machine and implement operation and wireless communication. Areas 606 inside the center of the steering 604 can be used for placing various control buttons, selection buttons, and the like.

Figure 7A:
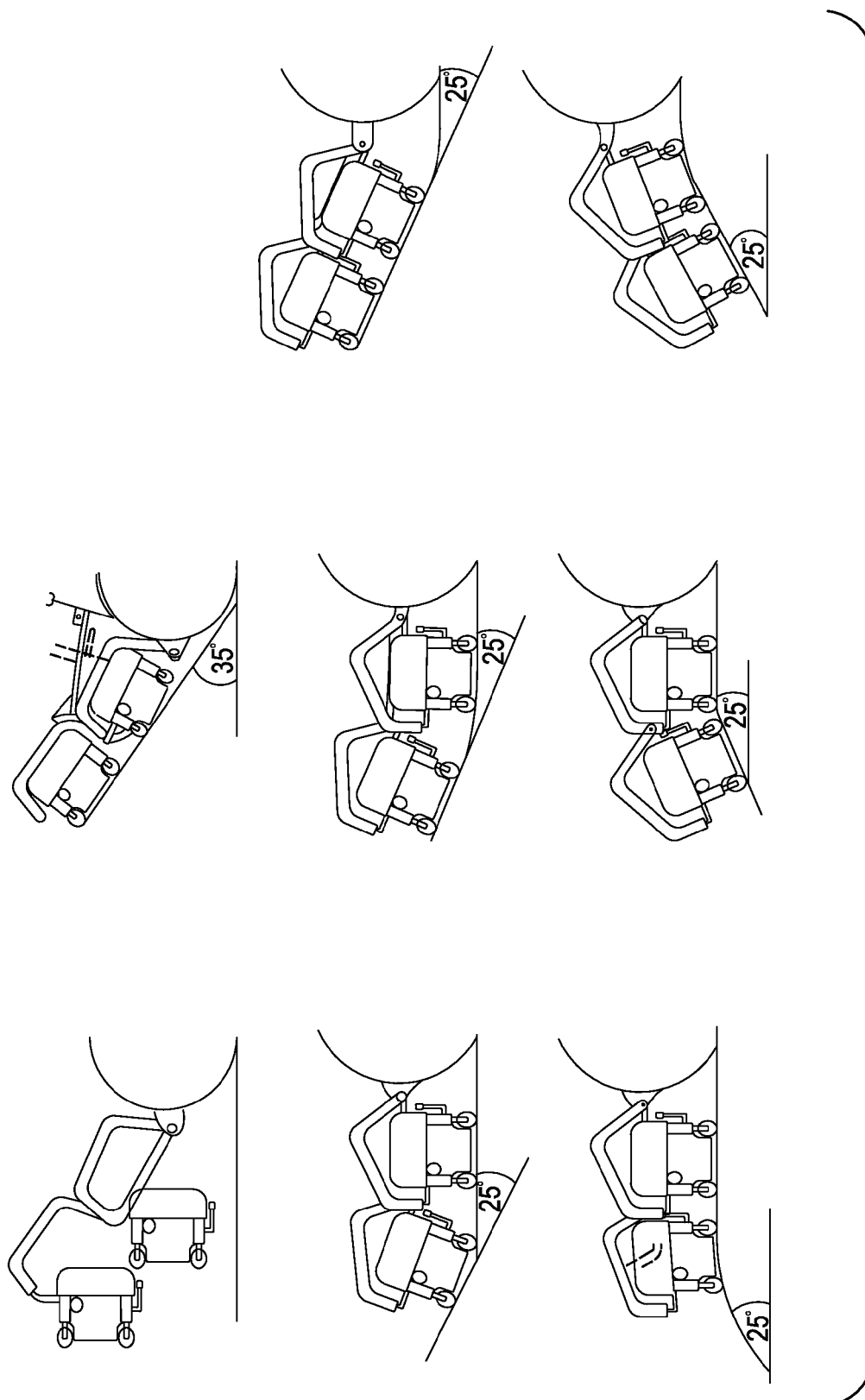
FIGS. 7A-7B show automatic implement ground tracing system with increased lifting for improved travelling capabilities on uneven ground.

FIG. 7A illustrates automation provided by an implement ground tracing and implement lifting and lowering system. In FIG. 7A, examples are shown on implement 301 or 302 and implement lifting system 411, wherein operator assistor 507 shows an outer line of an implement working area, as shown in FIG. 5A. The system further includes swivel joint 410, as well as polished and tempered shaft 408, and linear slide bearing or ball bushing 409. Electronic height position controls 711 and 712 can be mounted directly on a shaft, and which provide implement lifting and lowering motor 402 the impulse to lift an implement via lifting arm 407 to a median level of shaft 408.

FIG. 7A further shows lifting arm 407 at a lowest position and being lowered to a mid position, and lifting arm 407 at a top position. The system allows for an automatic implement ground tracing system, and frees the operator to perform other actions or allows autonomous machines to work safely without harming the ground, turf, and the like. The lifting and lowering cables 705 and 706 are at rear ends of an implement. However, when wider range of lifting and lowering are employed, implement swinging during fast travel between jobs can be a problem, and steady down force of the mower unit can improve and maintain constant a mowing job.

Figure 7B:
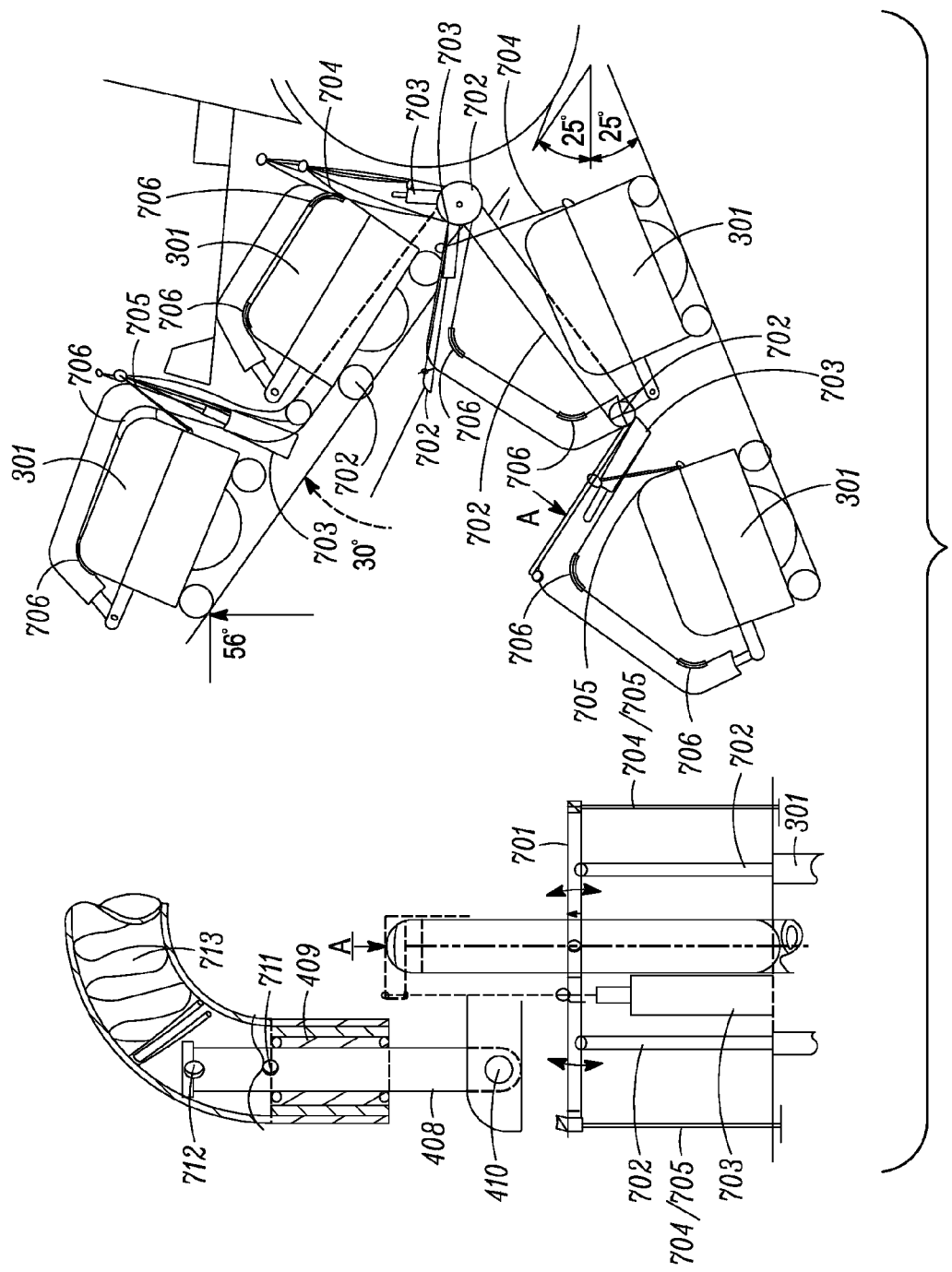
Figure 12A:
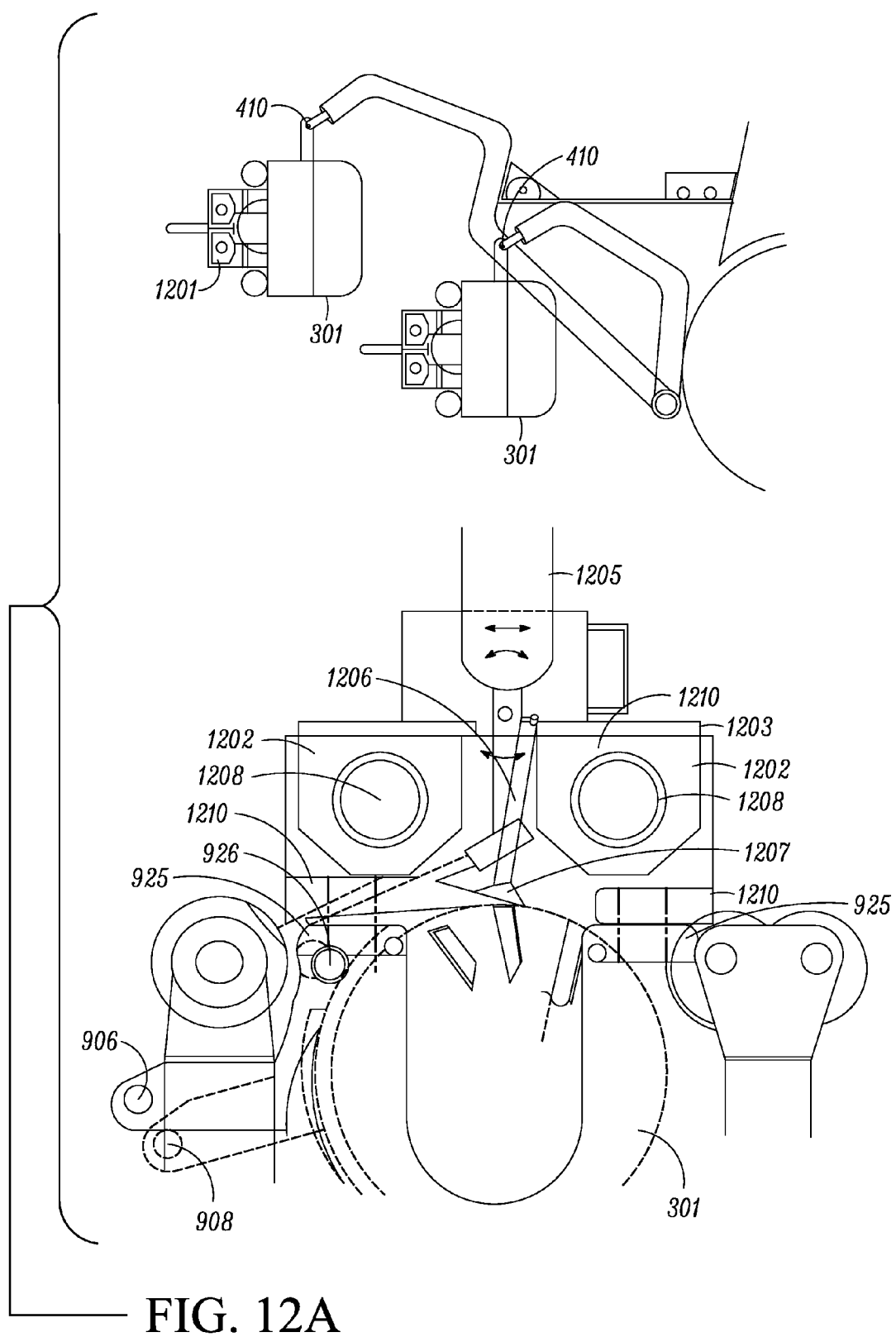
FIGS. 12A-12B show a reel mowing unit configured for sharpening of reel and bottom blade without dismounting the unit from the machine.
Figure 12B:
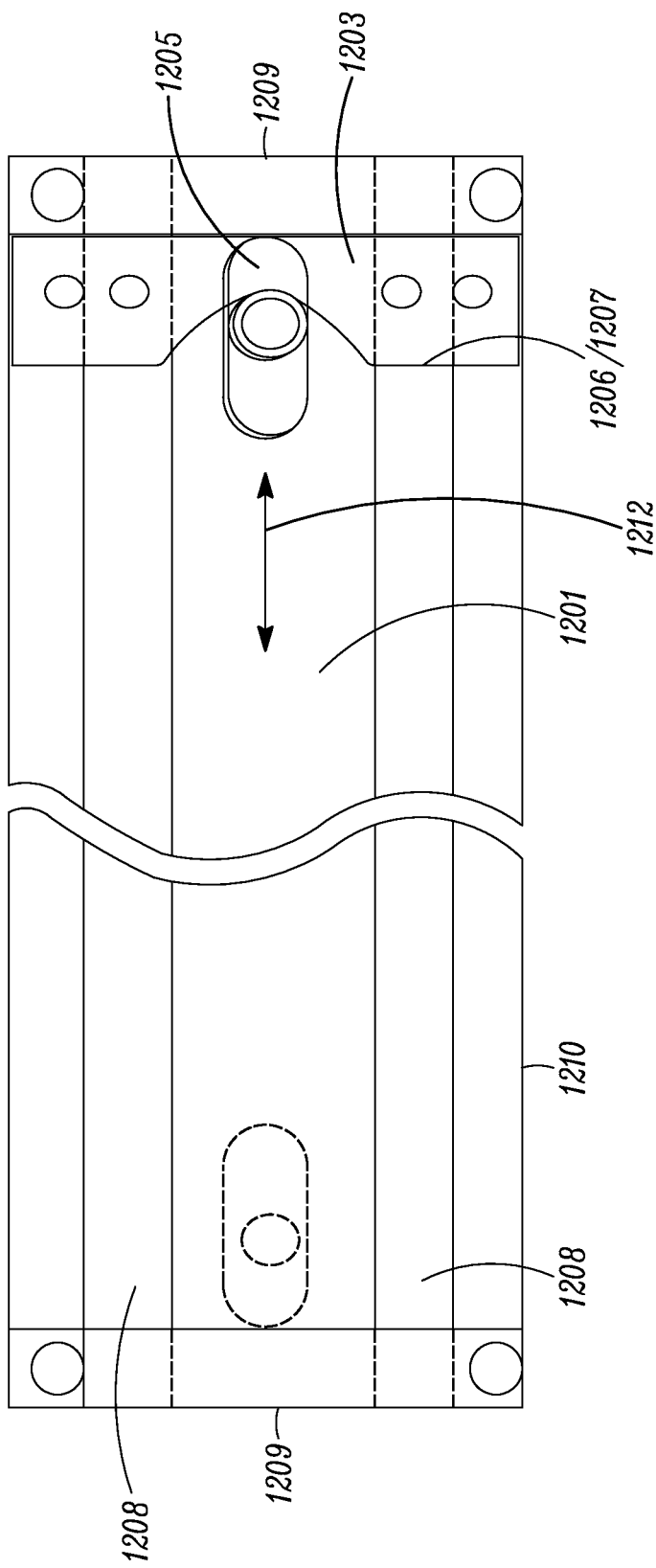

FIG. 7B provides a solution for above and other problems. For example, a spring 713 placed inside lifting arm 407 can provide a constant pre-calculated down force on a front part of the implement. At the rear is provided a system including a cross bar 701 that travels along the lifting arm 407 up and down and pushed by rods 704 and 705. The cross bar 701 is pulled down by constant force springs 702, which the force thereof pulls down on rods 704 and 705 and in turn an implement, such as mower unit 301, and the like, with via the constant force of the springs 702. As the lifting and lowering range is increased, a linear motor 703 can be provided to raise the cross bar 701, advantageously, allowing the implements to raise up against soft lined stops 706. Accordingly, the above and problems are resolved, and such a system can be used in assisting in the sharpening of a mower unit mounted on a machine, for example, as shown in FIGS. 12A and 12B, as the mower units 301 can be raised higher above the ground, and the like.

Figure 8:
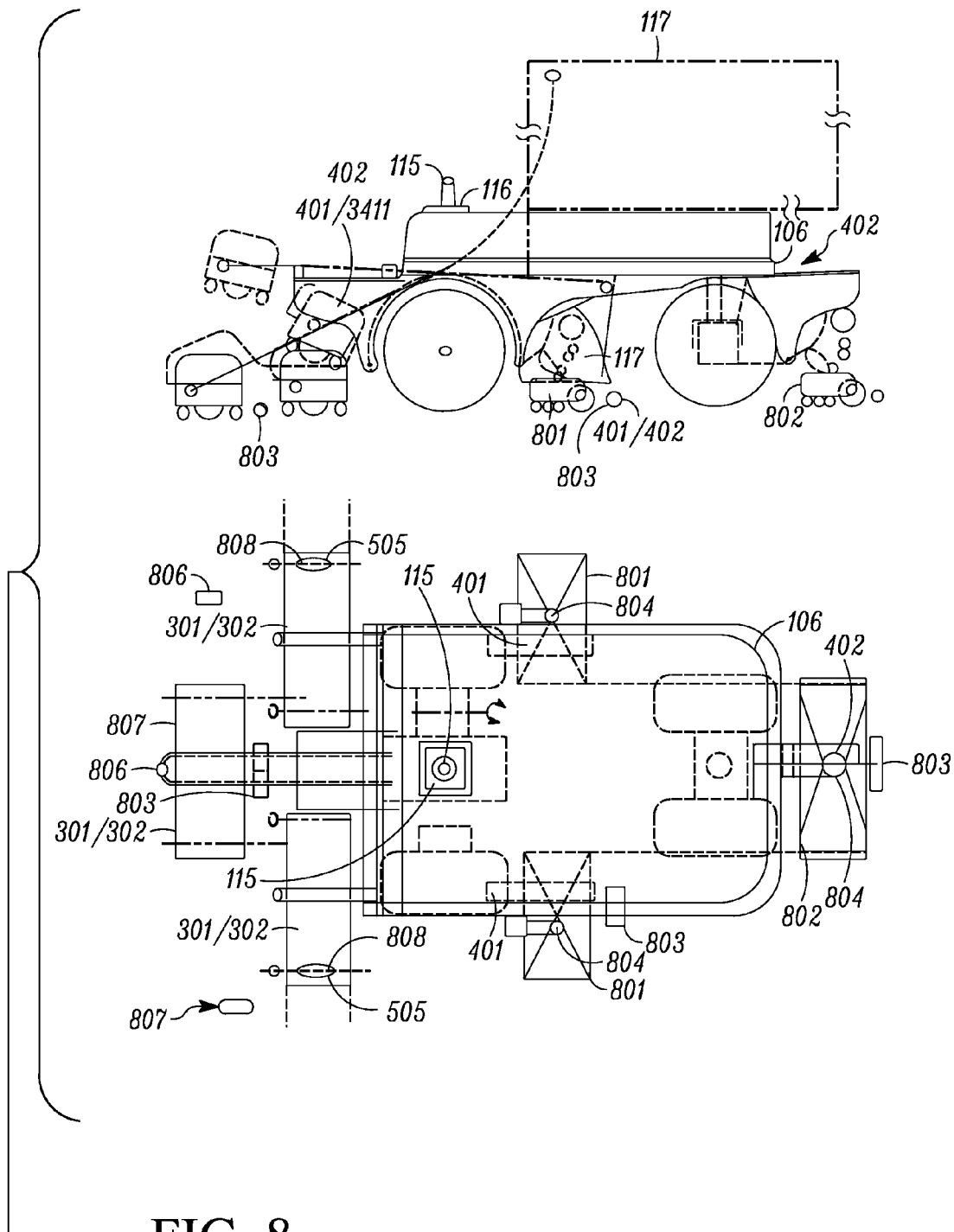
FIG. 8 shows capabilities for multi-purpose work with one pass operation.

FIG. 8 shows the multi-purpose design and applications of the vehicles and machines 100, and the like, including interchangeable features and designs used to advantageously achieve multi-purpose applications, and the like. The interchangeable lifting gear design 401/3 used for implements 301 and 302 can include installation in the front of the machine 100. The frame design tube 106 of the machines 100 can include a hollow square or rectangular tube around the machine frame to provide for implement mounting thereabound, advantageously, expanding the multi-purpose application potential of the machine 100, and increasing the rate of machine utilization.

Alternative locations of electronic green speed measuring units 803 are shown, which provide impulse to lifting gears 401 and 402 to increase or reduce the roller implement force subjected on ground, and controlled by the force measuring devices 804 to achieve a pre-planned or pre-programmed green speed. Above the machine 100 there is an area 805, where more optional implements can be placed or mounted on rectangular or square tube 106 around the machine 100. This area can also be place for storing containers of liquids, and wherein the associated spreading or dispersing units can be placed under the machine 100.

Weed detectors 806 and green detectors 807 are shown, whereby requirements for fertilizers and weed controls can be programmed and mapped (e.g., via VRS GPS or GLONASS or GALILEA, etc.) in the computer programs of the machine 100 via antenna 115 and receiver 116 and/or systems 808. An example of the location of an implement outer work area is shown by operator assistor 507. Implement guidance system antenna/receiver 808 is shown, and which can also be used for mapping working areas into ICT-systems, and the like.

Figure 15:
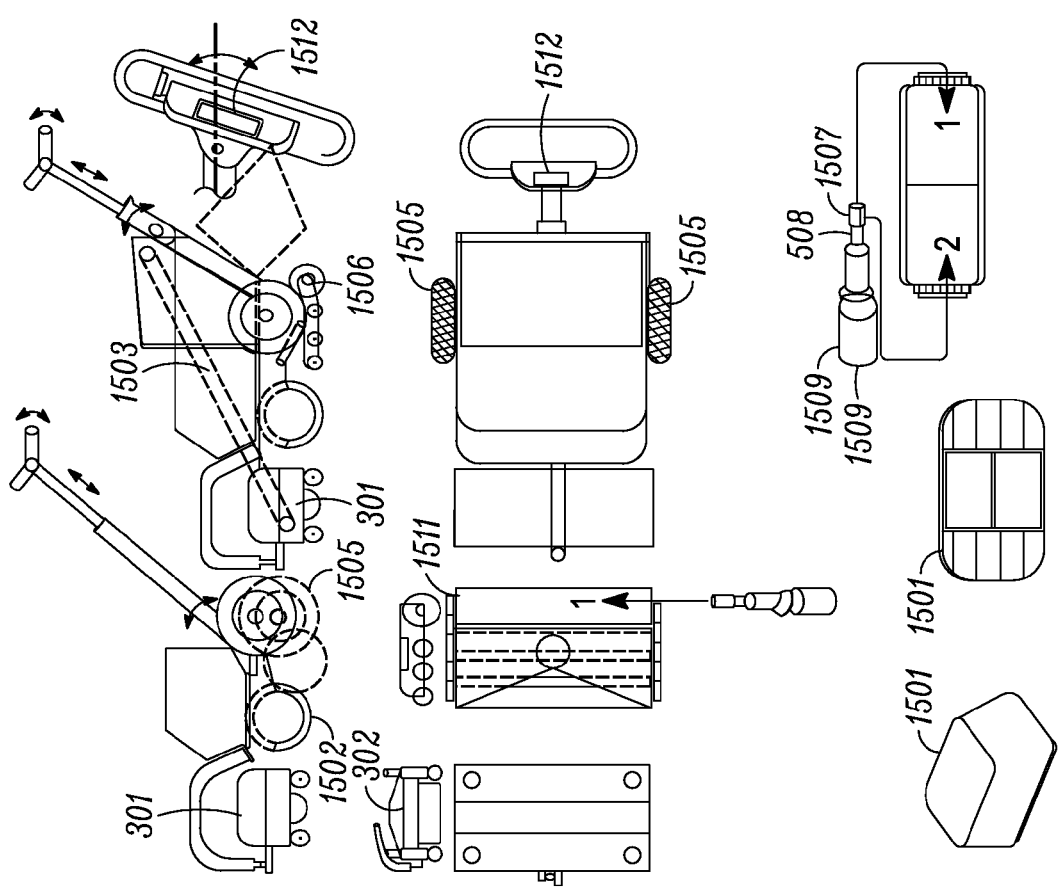
FIG. 15 shows a walk behind single mower machine for multi-purpose operations and wireless communications using implements and designs of FIGS. 1-14.

In FIG. 8, three turf improvement roller implements 801 and 802 are shown and further detailed in FIG. 15. FIG. 8 also shows an automatic clippings collection and dispersion system, including alternative locations of clippings containers, and unloading capabilities, as further detailed in FIGS. 10A-10B.

FIGS. 9A-9B illustrate an innovative reel mowing unit with electronic programmable cutting height and reel rotation speed control and automatic clippings collection and dispersion system to allow mowing of greens, fore-greens, collars, Tées, and the like, in an operator driven manner or for unmanned autonomous operation. In FIG. 9A and FIG. 9B, the frame of the mowing unit 901 is shown, wherein tooth bars 902 and tempered and polished corner shafts 903 form the cutting height adjustment slides, which are guided, for example, by 2 pieces per corner, linear ball bushings or linear slide bearings 904.

An example of the innovative design of the mowing unit attachment to implement lifting gear swivel joint 410 is shown in FIGS. 4 and 7, and which allow the free turning of the mowing unit for service, inspection and maintenance work, and where FIGS. 12A-12B show an innovative example thereof. An innovative cutting clearance adjustment 905, between the reel and a bottom blade is shown, and which allows a wide clearance opening by removing pin 906, wherein lever 907 moves to a fixed point 908 or two eccentric bolts 926 can be used, whereby opening is allowed. For example, as shown on FIGS. 9A-9B, the bottom blade sharpening of the reels 918 and bottom blade 910 can be performed, as further shown in FIGS. 12A-12B with an innovative sharpening unit fixed to a mowing unit.

Bottom blade holder 909 is fixed by 2 tempered bolts on frame 901 (e.g., one on each end), and bottom blade 910 is bolted thereunder. The cutting units can travel on the ground on round rollers 911. The height adjusted groomer 912 can be used to vertically-cut turf and groom to a pre-adjusted depth. The clippings collection conveyer tube 913 is open at a quarter on the top-side toward a reel rotation direction thereof, as part of the automatic clippings collection and dispersing system of FIGS. 10A-10B. Further provided are reel 916 of the reel cutting unit, interchangeable mounting plates 914, and bearing blocks 915. The plates 914 are accurately produced and metal pin guided and fixed (e.g., by bolts, etc.) on the frame 901, and when the reels are sharpened, the outside diameter is reduced, whereby the reel and bottom blade cutting angle can change. The end plates 914 can be replaced with new set of accurate end plates with suitable configurations, so that the reel center line can accurately change to achieve an ideal bottom blade and reel cutting angle, advantageously without time consuming and difficult manual adjustments, and the like.

In FIG. 9A, the cutting motor 916 powers the cutting reel. Also provided are pulleys 917 and belts 918. The toothed wheels 919 with matching teeth of tooth bars 902 can be used to accurately adjust the cutting height. Planetary gear 920 and motor 921 with brake and absolute encoder are used to power the cutting height adjustment system. In operation, the motor is only powered for the time of adjustment, and otherwise the brake locks the height to an adjusted level, and the absolute encoder shows numerically on a touch screen, and the like, the programmed height reached.

An alarm buzzer and light warning can be triggered, for example, if the programmed height has not been reached on the cutting units. The brake keeps energy from being used between adjustments, and keeps a pre-programmed cutting height constant, resulting in energy savings, quality of work, and the like. The planetary gear 920 increases the holding force used to maintain the programmed height at all suitable times. The shafts 922 and 923 transfer the movement between wheels 919. Mounting pieces 925 show the mounting points, wherein guiding and threaded bolt holes are used to fix optional implements on the cutting unit, as shown in FIGS. 12 and 13. The leveling adjustment unit 924 is used for leveling adjustments for all suitable cutting height adjustment slides, and for backlash elimination, advantageously, improving cutting height accuracy.

Figure 14:
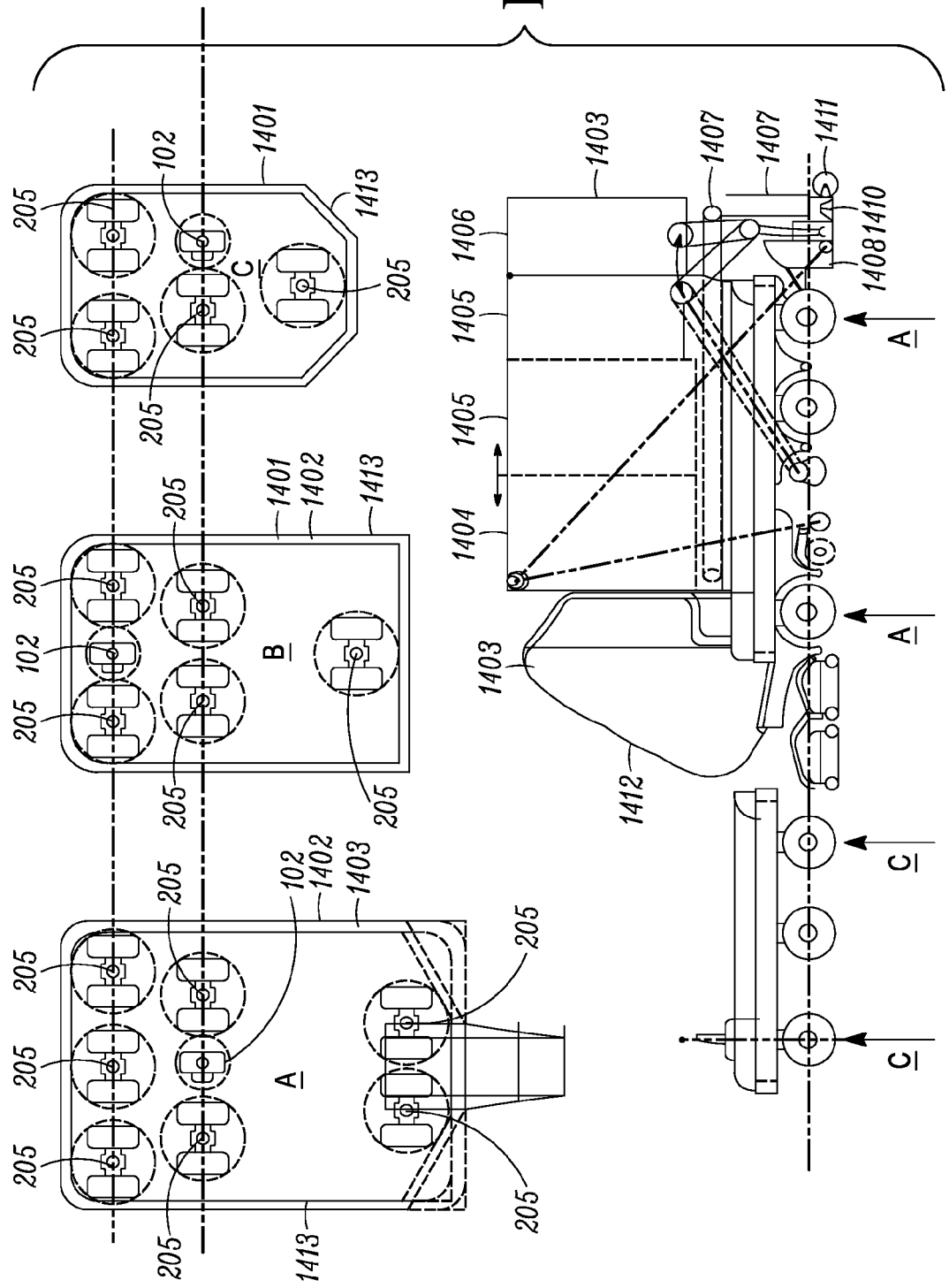
FIG. 14 shows further configurations for multi-wheel and multi-purpose machines.

FIG. 10A shows the silent automatic clippings collection and dispersing system, which can be built into the machines 100, and the multi-application machines of FIG. 14. In FIG. 10A, a clipping collection tube 1001 can be placed directly in front of the reel, as shown in FIG. 9A, element 913. Flexible housing 1002 is provided, and rim wheels 1003 are used for guiding the tube conveyer drag cable around sharp corners, and the like. Motorized sprocket wheel 1004 with planetary gear is shown, and which can move the drag cable inside the tube to move the clippings. Such a motorized system can be built to power 2 to 3 conveyor lines with a single electric motor and planetary gear unit, as shown at 1003, 1004 and 1005. The system further includes sprocket wheel 1005, and bent round tubes 1006 in the tube system and clippings emptying section 1007 of tube conveyor, wherein a bottom side thereof is open, and the section 1007 is built with a brushing and shaking section to empty clippings down to clipping collection container 117. The clipping collection container 117 is equipped with powered bottom conveyor and gate opening and closing to disperse clippings on indicated areas without needing to stop the machine 100.

The above systems and detailed components can be used with rotary mowing units 302, as shown on FIG. 10A, which can also work on leaf, needle, rubbish, and the like, collection.

FIG. 10A also shows the use of clippings collection and dispersing systems on other applications, such as the multiple purpose machines of FIG. 14 used on turf, and other landscaping care and improvement jobs, and the like. For example, FIGS. 9A, 9B and 10A show the innovative system, which allows 18 hole golf course mowing and clippings collection, clipping dispersion on one go, all without stopping the machine 100 operation. The system can be used for maintaining greens, fore-greens/collars, Tées, and the like, in an operator driven manner or in unmanned, autonomous manner, advantageously, providing battery powered, silent, electric and electronic, energy efficient, eco-friendly, sustainable machines.

The system described with respect to FIGS. 1, 4, 5A, 9A, 9B and 10A can be used for green clean-up and mowing, as shown in FIG. 10B, for example, wherein (1) on day 1 clean-up mowing is performed with 3 mowing units with cutting height and reel speed set-up for the job; (2) on day 2 are employed 2 inside mowing units with green cutting height and reel speed set-up, and selected for green mowing, and with the third outer mowing unit set up for fore-green/collar set-up; and (3) on day 3 are employed one of the inside mowing units with cutting height and reel speed set-up and selected for green mowing, and with the 2 outer mowing units set up for fore-green/collar set-up.

Advantageously, with this schedule and configuration, the wheels are not following the same wheel track day to day, avoiding trampling of the grounds on a same track. In addition, the inner side mowing head does not follow the same line every day, which leaves suitable marks on greens.

In addition, the automatic clippings collection system works along with the noted operations, and directly after a clean-up operation, the job can continue directly with a fore/collar mowing job with all mowing units set-up for the job. After fore/collar mowing, the operation can continue to the next Tee, with the clippings dispersed along the way with continuous operation, and with a Tee mowing height/reel rotation speed selected, resulting in operational savings, as all 18 holes can be mowed in one continuous operation, and the like.

Figure 11A:
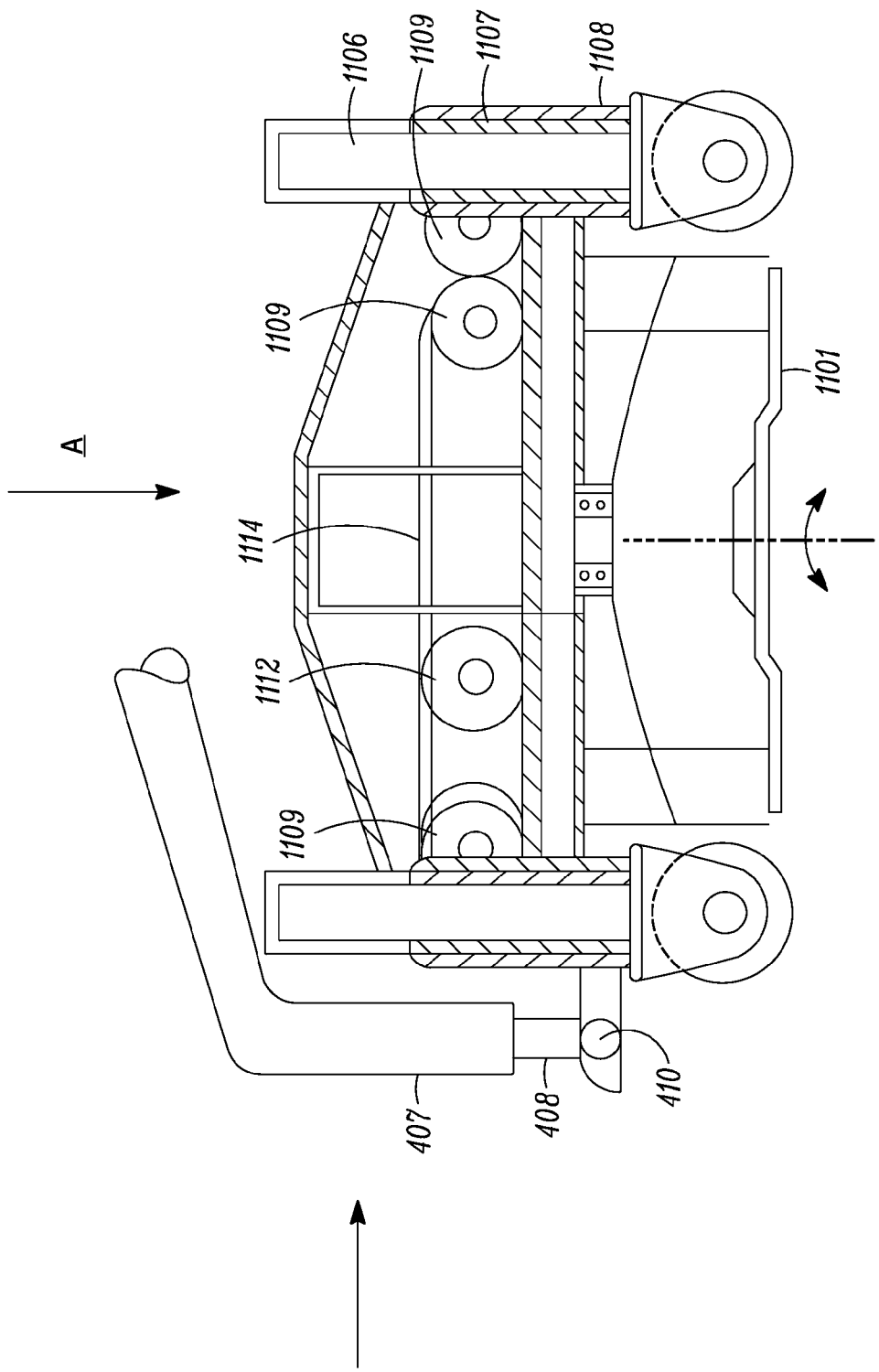
FIGS. 11A-11B show a double blade rotary mowing unit with programmable cutting height selection and alternative selection of clipping dispersion or bio-clipping and mulching.
Figure 11B:
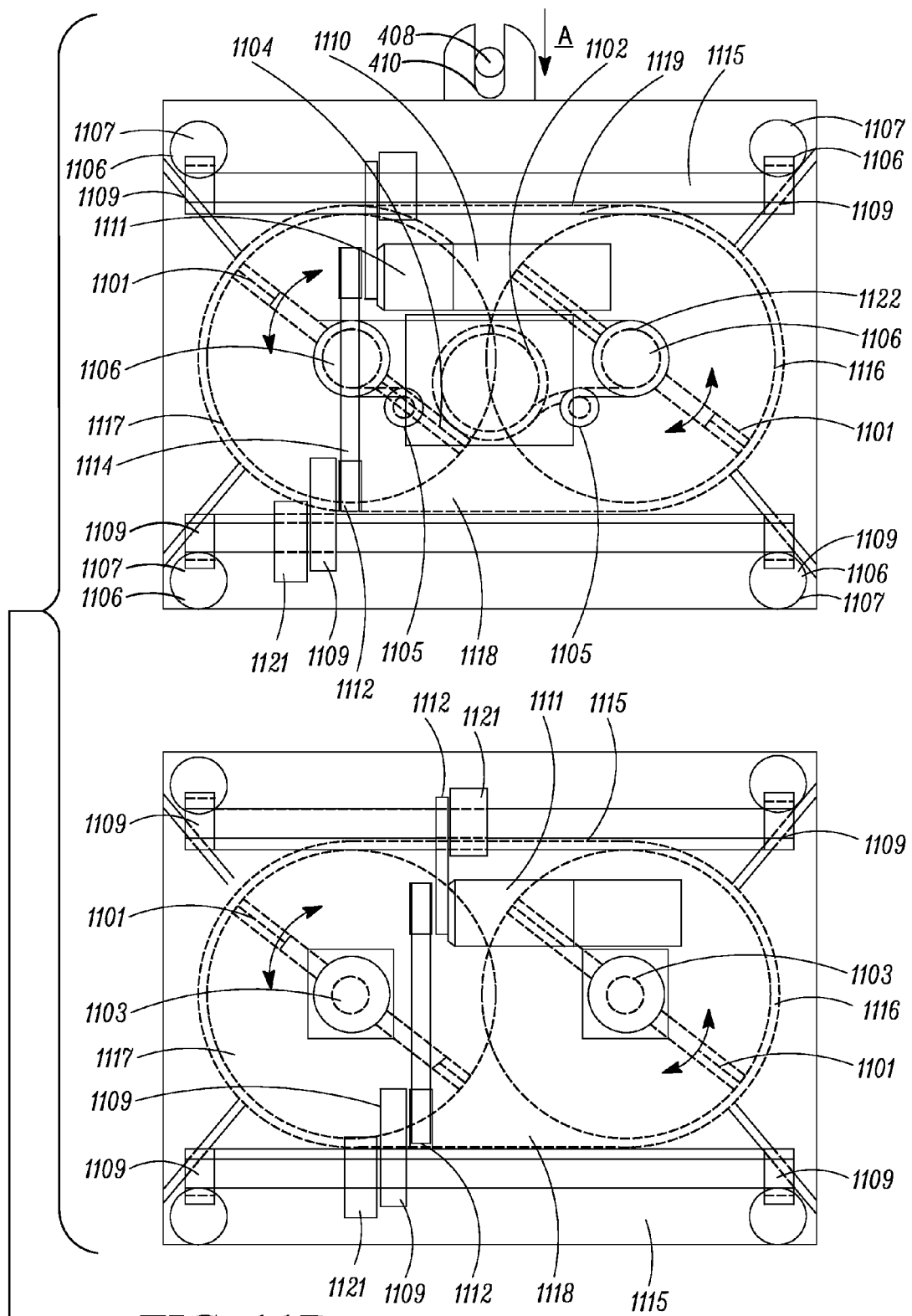

FIGS. 11A-11B show the rotary mowing unit 302, which can be used for mowing grass in parks, and turfs, semi-roughs, and roughs at the golf courses, and the like. The system uses a double blade 1101 design to reduce the overall weight and dimensions of the rotary mowing unit, which can be directly mounted and be directly easily exchangeable with the reel mowing unit, advantageously, increasing machine utilization time, and reducing investment costs.

In FIG. 11A, the rotary unit can have direct blade drive with two motors 1103 shown in FIG. 11B or with one centrally located double capacity motor 1102, as shown in FIG. 11A. The double capacity motor 1102 drives toothed, endless belt 1104, two piece tensioning rollers 1105, and two piece toothed pulleys 1106, to drive both blades, which are installed apart from each to prevent the blade tips from engaging each other. The blade rotation can be controlled by electronic drive control, and the rotation of one blade can be reversed by using a gear 1122 mounted on toothed pulley 1106.

In FIG. 11B, using the two piece motor system, the electronic drive control can be used to prevent the blade tips from catching each other during rotation, and a direction of rotation can be programmed, wherein one of blades can be programmed in a reverse rotation mode. Various types of motors can be employed, for example, with a maximum rotation speed from about 5000 to 6000 RPM and above, so that a suitable blade tip speed can be reached for improving cutting quality, and the like.

Frame 1108 can include the programmable, electronically controlled cutting system for pre-programmed and accurate selection from the machine 100 operating system and/or autonomous machine operation (e.g., with a VRS GPS/GLOSSNAS/GALILEA operating system). Also provided are fine toothed shafts 1106, linear slide bearing or ball bushing 1107, and with gear 1109 having fine teeth to work with the shaft 1106, so as to move up and down to the pre-programmed cutting height selected from operating system. Servo motor 1110 is built with a brake and absolute encoder to perform cutting height adjustments accurately and in a locked in manner via the motor brake. Advantageously, power consumption is minimized to only the adjustment time in seconds, wherein the absolute encoder provides an indication that all the units have reached the selected height, shows the height in operating system display, and if not, can generate warning and/or buzzer sound, and the like. A planetary gear 1111 is used to increase a positional holding force, wherein toothed timing wheels 1112 and timing belts 1113 and 1114 are used for turning shafts 1115, which turn gears 1109 to perform the height adjustment. A level adjustment unit 1121 is used to level adjust the cutting height adjustment shafts 1106 and to eliminate backlash, advantageously, improving cutting height accuracy.

Also shown are right side gate 1116, left side gates 1117 and front 1119, and back side gate 1118, which can be lifted up manually or in a motorized fashion to direct the blown clippings towards a desired direction. When all gates are closed, the rotary mowing unit can be configured to mulch, bio-clip, and the like. The mowing unit lifting system further includes the swivel joint mounting 410 for the rotary mowing head with the shaft 408, the implement mounting 410, and the lifting arm 407. A locking ring and gear 1122 is employed to allow rotary cutting blade rotation direction to be reversed, providing for numerous applications and uses for the rotary cutting unit.

FIG. 12A is used to illustrate sharpening of the reel mowing units 301 via the implement lifting swivel joint 410 and the implement lifting and lowering gear 401. In FIG. 12A, the swivel joint 410 allows the mowing unit 310 to hang down in a vertical position. A reel cutting unit sharpening device 1201 is mounted on the reel cutting unit 301. In FIG. 12B, the sharpening device 1201 can include 2 linear bearing units 1202 joined together by mounting plate 1203. These form a base to fix sharpening machine 1205, grinding wheel shaft 1206, and grinding wheel 1207. This system provides for an adjustable sharpening device travelling along linear bearing shafts 1208 and fixed with 2 piece twin shaft blocks 1209 on a sharpening machine frame 1210.

The sharpening machine frame 1210 is guided and bolted on the fixing lugs 925 of the reel mowing unit 301, as shown in FIG. 9B. Motorized linear grinding head transfer system 1212 moves the sharpening device at a programmed speed. The bottom blade adjustment 906 can be freed, and the arm can be locked into position 908, which allows sharpening and front facing of the bottom blade, rounding of the reel, sharpening of the reel blades to a specified angle, and the like. Alternatively, eccentric hardened pin bolts, and the like, can be used. The use of a locking ability or eccentric pin bolt, advantageously, allows the blade to be resting steady on the frame 1210.

The reel motor 916, as shown in FIG. 9A, turns the reel and transfer system 1212 not shown in detail, which operates the sharpening device to allow rounding of the reel, reel blade sharpening into a specified angle, bottom blade sharpening and front facing, and the like. Advantageously, the reel mowing units can be sharpened without removing them from the machine 100, resulting in more frequent sharpening, bottom blade facing, and the like, improving the quality of the cut.

FIGS. 13A and 13B show the reel mowing unit 301, and the rotary mowing unit 302 washing and drying system. In FIG. 13A, the system can include the motorized reel 916, a sealed water bucket 1301, a water inlet 1302, and compressed air inlet 1304, the clippings collection tube conveyor 913, and a motorized selection valve 1303, which form the water and air, automatic, washing and drying system. With this system, the mowing units are placed into water bucket and/or buckets 1301, and a washing program is selected from the machine 100 operating system, wherein reels 916A are turning, and the tube conveyor 913 is working, so that pressurized water sprays into the bucket 1301 from the nozzle 1302.

The washing cycle thus commences, including forward and reverse cycles, until the pre-programmed washing cycle is completed. At this point, the valve 1303 changes from providing water to providing pressurized air via air inlet 1304. This operation blows out water and dirt, while the drying cycle with reel 916, and the clippings collection tube conveyor 913 are operating, including the mower units, tubes, and clippings and/or furbish collection box, until the washing/drying cycle is completed. These operations can be performed automatically, whereby an operator is not needed to perform such wet work, and while keeping the working area tidy. The rotary cutting units/decks can be washed and dried using similar operations, as shown in FIG. 13B.

FIG. 14 shows the multi-purpose 9-wheel machine 1401, the 11-wheel machine 1402, and 15-wheel machine 1403, configured as multi-purpose machines. These machines are built using the various types of described implements and features and can be used as fully electric and electronic platforms for various existing and to be discovered applications. The 9 and 11-wheel feeder machine 1401 and 1402, and the 11 and 15-wheel carrier machine 1402 and 1403, are novel examples of the various system configurations available. FIG. 14 shows the FIG. 2 components, parts and designs, modified for the machines 1401, 1402 and 1402 applications, for example, using the steerable wheel unit designs 102 and 205, including servo drivers 207, other electronic designs, and provided with mechanical and/or air suspension, and the like. The wheel pattern design can include the wheels being configured for forward and reverse driving, and for on ground travel without leaving individual wheel tracks, as shown in FIG. 14.

A movable tube or bucket conveyor are used for loading of verti-cuts, clipping, scarifies, aeration pieces, and the like, into container 1404, which then are loaded into container 1405 of the feeder 1401 or 1402 with a belt or a tube type conveyor of FIGS. 10A-10B, and so as to be transported away. The feeders 1401 or 1402 are used to bring back top-dressing sand, fertilizers, and the like, to containers 1405, 1406, and the like, and on the way returning with container 1404, and which materials can be spread as a top-dressing, for example, by the belt conveyor 1407 and the tube conveyors, and the like, on turf, ground, and the like.

Also provided are hollow or tine aerator 1408, seeder 1409, brusher 1410, finishing roller 1411, and suspension fertilizers and/or weed control tanks (not shown), which are indicative of the multi-purpose jobs that can performed by the combination of the feeder and carrier systems, and the like. The machines further include seat and steering column and safety cabin 1412 for manned machines, push type implement mounting, and the implement lifting and lowering system 401, such as for mowing, vertical-cutting, scarifiers, and the like.

Advantageously, multiple types of jobs can be performed in one pass, and fertilizers, pesticides, weed controllers, and the like, can be dispersed efficiently to a required depth, and the like, and without flushing into the environment, and the like. The machines 100 can be programmed to be used efficiently during rain and irrigation conditions, using information received by the various sub-systems, including the seekers or sensors shown in FIG. 8, and mapped by the antenna 115 and receiver 116 system (e.g., using VRS GPS/GLOSSNAS/GALILEA, etc.). A heavy tubular beam structure around the frame is employed and provides support and a mounting structure for use of various implements, resulting in multi-application machines providing numerous advantages.

The systems and components of FIGS. 1-15 can provide un-manned, smart machine systems, for turf care, landscaping jobs, and the like, resulting in increased quality of work, reduced investments and operating costs, sustainability of turf care, and the like, including accurate and reduced use of chemicals, and the like, whereby materials are placed under the grass surface, where needed, advantageously, reducing flushing into water tables, and the like, all while being performed in an emission free, and silent manner, and the like.

FIG. 15 shows a walk behind, single mower design, including quick exchange battery pack 1501 and electronics similar to those of FIG. 1. In FIG. 15, the system further includes split power drum 1502 for steering with servo motors 1507, planetary gear 1508, and mechanical parts and components 1509 and other suitable components to move and steer from the machine 100, the reel mower unit 301, as described in FIGS. 9A-9B, and/or the rotary mower unit 302, as described in FIGS. 11A-11B. Other optional implements of FIGS. 11A-11B are shown, including clippings collection and disperse system 1503, and clippings collection container 1504, as described in FIGS. 10A-10B.

Powered wheels 1505, when turned downward are driven by the drive drum 1502 and gear design to transport and steer the mower from work location to work location. Also provided are a turf improvement roller implement 1506, as described in FIG. 8, elements 801 and 802, and lifting and lowering gear 401 with down force capabilities. Finishing roller 1511 can be configures as either free rolling or as a powered roller 1511 with single motor and planetary gear drive, and with smart phone or other type of communication device capability and with touch screen 1512 housing including the operating system of the machine, and the internal and external communication and programs for wireless remote diagnoses and operating data collection for service provider purposes, as previously describe.

Thus, the basic machine design of FIGS. 1-15 can include:

An interchangeable, fully electric and electronic range of mobile, silent, multi-purpose machines and vehicles for golf course maintenance, turf care, landscaping, outdoor work, transportation, and the like, as well as overnight silent operation with novel features, for example, such as:

Interchangeable lithium-ion battery powered with a battery management system (BMS) and suitable ICT systems and programs for providing quick battery exchange, manual or automatic operation, and the like, for sustainable, eco-friendly operation, with energy savings, brake energy recovery, fluid free and silent operation, and the like.

An interchangeable worldwide wireless remote diagnoses system for after-sales-service purposes with preventative maintenance to reach 100% machine availability and performance and operating results, including data collection for service provider type of agreements with customers and with an aim to reduce administrative work, and reach one time invoicing per month. This can be coupled with long term leasing,
a top efficiency power train with product lines employing similar or the same tire, wheel, planetary gear, servo motor, servo controller, drive sizes and designs, and the like, throughout the product line. The interchangeable system components can mounted on various interchangeable frame designs with suitable wheel pattern designs, and the like, for leaving an even wheel track surface without individual tire tracks, as well as improved weight distribution on a larger wheel print area and with less trampling of ground and need for aeration. The efficiency level from the battery pack to the wheels can reach up to about a 90% efficiency rating, and with zero emissions, as compared to a diesel engine vehicle, which from tank to wheels has a maximum efficiency of about 25%.

The mowing machines of FIGS. 1-15 can include:

Interchangeable machine frame designs, with only 3 frame sizes covering various mowing machine applications, including from 3 to 5 to 7 reel and rotary mowing configurations with a mowing width from about 51 to 138 inches.

Interchangeable implement mounting, lifting, lowering and down forcing design, with quick implement changing, and with a manual or motorized side-shifting capability.

Multi-purposes design of all the lines of machines, wherein various implement designs can be mounted in front, rear, both sides, under and above, as well as alternative operating and driving directions, according to job requirements, and with savings of investment costs, increase of machine utilization rates, and lower needs for storage space, servicing, and the like.

Interchangeable mowing unit designs, including reel and rotary designs with electronic programmable cutting height, reel/rotary rotation speed and travelling speed of machine or cuts per meter, and the like, to achieve uniform, improved mowing results, and highly valued green speed, and turf improvement. The result measurements of mowing operations and the automatic clippings collection and dispersing provide for bio dynamic growing substance, whereby greens, fore greens, collars, Tees, and the like, can be mowed with one pass, resulting in operating cost savings, and less trampling of the turfs, thereby reducing needed aeration operations. The mowing units can be sharpened and washed and dried without removing the unit from the machine.

The golf course maintenance and turf care machines of FIGS. 1-15 can include:

Performing about 30 or so additional and different jobs for golf course maintenance and turf care after the mowing and related jobs. Conventionally, each job requires a different, noisy combustion engine powered 3 to 4 wheel machine, carrying quite heavy loads and thus leaving wheel tracks on the turf. These machines can be replaced by the multi-purpose machine 100 having electric and battery powered operation, and which use interchangeable features from the mowing machine configurations, for example, including:

The 11 to 15 wheel, multipurpose machines 100, including the 11 wheel feeder and 15 wheel carrier machines having interchangeable drive systems and wheel patterns for leaving even turf marks and without wheel tracks due to reduced weight distribution, due to the large number of tires employed. This provides a vast tire print area, wherein the swiveling shaft designs keep all wheels on ground during travel over uneven surfaces and with even wheel load distribution.

The machines are designed for multi-purpose applications with an extensive range of implements.

The seed, fertilizer, pesticide, and the like, requirement and irrigations needs can be analyzed with suitable seekers or sensors attached to the mowing units, and with the data being transferred wirelessly to the information (e.g., ICT) system, and mapped with GPS for precision turf care. Advantageously, seeds, fertilizers, pesticides, and irrigation can be used only where actually needed and in the depth needed, without having excess materials flushing into the environment. This results in operating, investment and material cost savings, providing green, eco-friendly golf course and turf care. The described machines can be configured for any other suitable applications, and provide the platform for other types of applications and machines, as will be appreciated by those of ordinary skill in the relevant art(s) based on the teachings of the present disclosure.

The machines of FIGS. 1-15 in autonomous, unmanned, smart machine applications can include:

Addressing the need for cost savings in view of ever increasing labor costs, and the lack of professional workers. Companies must also find solutions to increase profitability, wherein increased revenues are important source. Golf courses loose revenues on busy seasons, when all the rounds cannot be cashed in due to the machines that are working during Tee-times. Conventional combustion engine machines cannot work overnight, as there are nearby houses and communities, which do not tolerate night time noise from such machines. Even the paying customers are annoyed by the machine noise during their games. The unmanned autonomous, silent precision golf course maintenance and turf care machines of FIGS. 1-15 can be the solution:

The operator driven machines 100 are designed to be retrofitted at a later time to operate as autonomous working machines, for example, using:

The VRS GPS/Glonass/Galilea, ICT-based systems, and the like, can be built with automatic steering and other operating systems to achieve unmanned, overnight, silent operating machines 100, whereby data for seeding, fertilizing, pesticides spreading, weed control and irrigation needs, and the like, are collected by the ICT-systems and used for precision turf care, with minimal materials employed.

The wireless remote diagnoses and combined operating and material data collections systems can be used to provide, for example, one invoice per month service. Agreement with long term leasing can be provided, whereby golf course revenues per an 18 hole course can increase in the hundreds of thousands per year and operating cost can be minimized.

Thus, the present invention is directed to a line of eco-friendly, cleantech and sustainable lawn maintenance machines and systems with aim to develop green golf courses, which is not reality today with current combustion engine and hydraulic machines, which use an excess of fertilizers and other vast variety of chemicals. The mowing and the increase of green speed can be performed on one go with the mower machines 100 using reel mowing units, a turf improvement roller system, and green speed measuring via the machine 100. The system allows collecting of the speed data (e.g., by GPS) for quality control purposes, and wherein speeds can be programmed to be the same on all greens or with different speeds to increase the difficulty of the game.

The above described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, cloud computing networks, a combination thereof, and the like.

It is to be understood that the described devices and subsystems are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, pigeons, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the prospective claims.

What is claimed is:

1. A lawn or turf care maintenance system, the system comprising:
    an unmanned, electric powered lawn or turf care maintenance machine, including:
    front and rear wheels including left and right wheels;
    a modular electric drive system for driving the wheels;
    a plurality of lawn or turf care maintenance electric motors;
    a plurality of modular attachments providing a plurality of lawn or turf care maintenance functions driven by the electric motors;
    a positioning system;
    a computer controller coupled to the modular electric drive system, the modular attachments, and the positioning system; and
    a server coupled to the computer controller and which provides for unmanned, location based operation of the lawn or turf care maintenance machine and the modular attachments,
    wherein the modular electric drive system includes a power train with respective drive units for each of the front and rear wheels,
    each drive unit includes a planetary gear system and servo motor system for each of the front and rear wheels,
    the power train includes steerable or non-steerable wheel power units, housing the respective drive units, and including respective servo controllers for each of the front and rear wheels,
    the wheel power units are configured for single, double or triple wheel configurations,
    the front and rear wheels are located so as to form an adjacent, continuous wheel track pattern over an entire width of the lawn or turf care maintenance machine over the lawn or turf,
    the drive units include an upper portion movably coupled to a lower portion such that the lower portion follows the ground by swiveling relative to the upper portion,
    the planetary gear system of the lower portion includes a left planetary gear for coupling to a left wheel and a right planetary gear for coupling to a right wheel,
    the servo motor system of the lower portion includes a left servo motor coupled to the left planetary gear, and a right servo motor coupled to the right planetary gear, and
    one or more of the drive units are configured to rotate 360 degrees around a central vertical axis thereof.

2. The system of claim 1, wherein the positioning system is one of a global positioning system, a Galileo positioning system, and a Glonass positioning system and which provides automatic steering, and
    the server includes a data capture system for capturing data for seeding, fertilizing, pesticides spreading, weed control, and irrigation needs.

3. The system of claim 1, wherein the modular electric drive system includes the power train with interchangeable tires, and with the wheels, the planetary gears, the servo motors, the servo controllers, and the drives also being interchangeable across a plurality of lawn or turf care maintenance system platforms.

4. The system of claim 1, wherein the electric motors drive interchangeable mowing units, including reel and rotary units with electronic programmable cutting height, reel and rotary rotation speed and travelling speed of the machine or cuts per meter.

5. The system of claim 1, wherein the modular attachments include a clippings collection and dispersing attachment, an aerator attachment, a seeder attachment, a brusher attachment, a finishing roller attachment, and a fertilizer attachment.

6. A computer implemented method for a lawn or turf care maintenance system, the method comprising:
    providing an unmanned, electric powered lawn or turf care maintenance machine, including:
    providing front and rear wheels including left and right wheels;
    providing a modular electric drive system for driving the wheels;
    providing a plurality of lawn or turf care maintenance electric motors;
    providing a plurality of modular attachments providing a plurality of lawn or turf care maintenance functions driven by the electric motors;
    providing a positioning system;
    providing a computer controller coupled to the modular electric drive system, the modular attachments, and the positioning system;

providing a server coupled to the computer controller and which provides for unmanned, location based operation of the lawn or turf care maintenance machine and the modular attachments, wherein the modular electric drive system includes a power train with respective drive units for each of the front and rear wheels, each drive unit includes a planetary gear system and servo motor system for each of the front and rear wheels, the power train includes steerable or non-steerable wheel power units, housing the respective drive units, and including respective servo controllers for each of the front and rear wheels, the wheel power units are configured for single, double or triple wheel configurations, the front and rear wheels are located so as to form an adjacent, continuous wheel track pattern over an entire width of the lawn or turf care maintenance machine over the lawn or turf, the drive units include an upper portion movably coupled to a lower portion such that the lower portion follows the ground by swiveling relative to the upper portion, the planetary gear system of the lower portion includes a left planetary gear for coupling to a left wheel and a right planetary gear for coupling to a right wheel, and one or more of the drive units are configured to rotate 360 degrees around a central vertical axis thereof.

7. The method of claim 6, further comprising providing the positioning system including one of a global positioning system, a Galileo positioning system, and a Glonass positioning system and which provides automatic steering, and providing the server with a data capture system for capturing data for seeding, fertilizing, pesticides spreading, weed control, and irrigation needs.

8. The method of claim 6 further comprising providing the modular electric drive system including the power train with interchangeable tires, and with the wheels, the planetary gears, the servo motors, the servo controllers, and the drives also being interchangeable across a plurality of lawn or turf care maintenance system platforms.

9. The method of claim 6, further comprising driving with the electric cutting motors including interchangeable mowing units, including reel and rotary units with electronic programmable cutting height, reel and rotary rotation speed and travelling speed of the machine or cuts per meter.

10. The method of claim 6, further comprising providing the modular attachments including a clippings collection and dispersing attachment, an aerator attachment, a seeder attachment, a brusher attachment, a finishing roller attachment, and a fertilizer attachment.

11. A non-transitory computer program product having stored thereon a program that when executed by one or more computer processors cause the one or more computer processors to execute a method for a lawn or turf care maintenance, the method comprising:

providing an unmanned, electric powered lawn or turf care maintenance machine, including:
providing front and rear wheels including left and right wheels;
providing a modular electric drive system for driving the wheels;
providing a plurality of lawn or turf care maintenance electric motors;
providing a plurality of modular attachments providing a plurality of lawn or turf care maintenance functions driven by the electric motors;
providing a positioning system;
providing a computer controller coupled to the modular electric drive system, the modular attachments, and the positioning system;
providing a server coupled to the computer controller and which provides for unmanned, location based operation of the lawn or turf care maintenance machine and the modular attachments, wherein the modular electric drive system includes a power train with respective drive units for each of the front and rear wheels, each drive unit includes a planetary gear system and servo motor system for each of the front and rear wheels, the power train includes steerable or non-steerable wheel power units, housing the respective drive units, and including respective servo controllers for each of the front and rear wheels, the wheel power units are configured for single, double or triple wheel configurations, the front and rear wheels are located so as to form an adjacent, continuous wheel track pattern over an entire width of the lawn or turf care maintenance machine over the lawn or turf, the drive units include an upper portion movably coupled to a lower portion such that the lower portion follows the ground by swiveling relative to the upper portion, the planetary gear system of the lower portion includes a left planetary gear for coupling to a left wheel and a right planetary gear for coupling to a right wheel, and one or more of the drive units are configured to rotate 360 degrees around a central vertical axis thereof.

12. The computer program product of claim 11, further comprising providing the positioning system including one of a global positioning system, a Galileo positioning system, and a Glonass positioning system and which provides automatic steering, and providing the server with a data capture system for capturing data for seeding, fertilizing, pesticides spreading, weed control, and irrigation needs.

13. The computer program product of claim 11, further comprising providing the modular electric drive system including the power train with interchangeable tires, and with the wheels, the planetary gears, the servo motors, the servo controllers, and the drives also being interchangeable across a plurality of lawn or turf care maintenance system platforms.

14. The computer program product of claim 11, further comprising driving the electric cutting motors including interchangeable mowing units, including reel and rotary units with electronic programmable cutting height, reel and rotary rotation speed and travelling speed of the machine or cuts per meter.

15. The computer program product of claim 11, further comprising providing the modular attachments including a clippings collection and dispersing attachment, an aerator attachment, a seeder attachment, a brusher attachment, a finishing roller attachment, and a fertilizer attachment.

* * * * *